(12) United States Patent
Chainer et al.

(10) Patent No.: US 7,707,060 B2
(45) Date of Patent: Apr. 27, 2010

(54) AUTOMATIC COLLECTION AND DISSEMINATION OF PRODUCT USAGE INFORMATION

(75) Inventors: Timothy J. Chainer, Putnam Valley, NY (US); Yasuo Amemiya, Hartsdale, NY (US); Steven W. Depp, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 1638 days.

(21) Appl. No.: 10/645,128

(22) Filed: Aug. 21, 2003

(65) Prior Publication Data

US 2005/0043978 A1 Feb. 24, 2005

(51) Int. Cl.
*G06F 17/30* (2006.01)
*G07G 1/00* (2006.01)
(52) U.S. Cl. .................... 705/10; 709/221; 360/31; 714/42; 714/718; 700/79
(58) Field of Classification Search .............. 705/7, 705/10
See application file for complete search history.

(56) References Cited

U.S. PATENT DOCUMENTS

| | | | | |
|---|---|---|---|---|
| 5,090,014 A * | 2/1992 | Polich et al. | .............. | 714/26 |
| 5,301,297 A | 4/1994 | Menon et al. | .............. | 295/425 |
| 5,727,144 A | 3/1998 | Brady et al. | .............. | 385/182.04 |
| 6,195,643 B1 * | 2/2001 | Maxwell | .............. | 705/10 |
| 6,223,252 B1 * | 4/2001 | Bandera et al. | .............. | 711/114 |
| 6,236,990 B1 * | 5/2001 | Geller et al. | .............. | 707/5 |
| 6,249,887 B1 * | 6/2001 | Gray et al. | .............. | 714/47 |
| 6,415,189 B1 * | 7/2002 | Hajji | .............. | 700/79 |
| 6,460,151 B1 * | 10/2002 | Warwick et al. | .............. | 714/718 |
| 7,089,506 B2 * | 8/2006 | Gantenhammer et al. | .............. | 705/26 |
| 2002/0036855 A1 * | 3/2002 | Lenny et al. | .............. | 360/53 |
| 2002/0053046 A1 * | 5/2002 | Gray et al. | .............. | 714/42 |
| 2002/0060868 A1 * | 5/2002 | Lenny et al. | .............. | 360/31 |

OTHER PUBLICATIONS

"Self-Monitoring Analysis and Reporting Technology (SMART)," Charles M. Keziorok, The PC Guide (http://www.PCGuide.com), Site Version: 2.2.0—Version Date: Apr. 17, 2001 (Available as website or CD-ROM (which can be purchased at www.PCGuide.com).

* cited by examiner

*Primary Examiner*—Beth V Boswell
*Assistant Examiner*—Nadja Chong Cruz
(74) *Attorney, Agent, or Firm*—Vazken Alexanian, Esq.; Blanche E. Schiller, Esq.; Heslin Rothenberg Farley & Mesiti P.C.

(57) ABSTRACT

Products include autonomic logic to self-monitor one or more parameters associated with the products to provide product usage information. Data relating to the product usage information generated by the products is automatically disseminated to interested entities. The interested entities may analyze the provided data and automatically forward information relating to the provided data back towards the products. The interested entities may also effect changes to products based on the data.

33 Claims, 15 Drawing Sheets

AUTOMATIC COLLECTION AND DISSEMINATION OF PRODUCT USAGE INFORMATION

CROSS-REFERENCE TO RELATED APPLICATIONS

This application contains subject matter which is related to the subject matter of the following application, which is assigned to the same assignee as this application. The below listed application is hereby incorporated herein by reference in its entirety:

"GROUPING OF STORAGE MEDIA BASED ON PARAMETERS ASSOCIATED WITH THE STORAGE MEDIA," Amemiya et al., Ser. No. 10/645,129, filed herewith.

TECHNICAL FIELD

This invention relates, in general, to facilitating information sharing, and in particular, to an automatic global collection and dissemination of product usage information.

BACKGROUND OF THE INVENTION

The testing of products prior to production is a critical stage in the development of the products. Although a great deal of information is learned during testing, even more information may be learned during actual usage in production. Further, some information learned during actual usage of the product is not discoverable during testing. The problem, however, is how to collect this information and forward this information back to the designers, manufacturers, etc. that can use the information to enhance the products.

Thus, a need exists for a capability that facilitates collection and dissemination of product usage information. A further need exists for a capability that facilitates analysis of such information.

SUMMARY OF THE INVENTION

The shortcomings of the prior art are overcome and additional advantages are provided through the provision of a method of facilitating provision of product usage information. The method includes, for instance, automatically obtaining product usage information generated by one or more products, wherein the one or more products include autonomic logic and wherein the automatically obtaining is independent of product user input; and automatically providing data relating to the product usage information to at least one interested entity.

In a further aspect of the present invention, a method of facilitating receipt of data is provided. The method includes, for instance, automatically receiving by at least one interested entity data relating to product usage information of one or more products, wherein the product usage information is automatically generated by one or more products, the one or more products including autonomic logic to automatically monitor one or more parameters of the one or more products.

In yet a further aspect of the present invention, a method of facilitating receipt of data is provided. The method includes, for instance, automatically receiving by at least one product receiver data relating to product usage information of one or more products, wherein the product usage information is automatically generated by the one or more products, the one or more products including autonomic logic to automatically monitor one or more parameters of the one or more products.

In another aspect of the present invention, a method of deploying product usage logic on processing units is provided. The method includes, for instance, installing logic on at least one processing unit, the logic to automatically obtain product usage information relating to one or more products, wherein the one or more products include autonomic logic to automatically generate the product usage information independent of product user input.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1A:
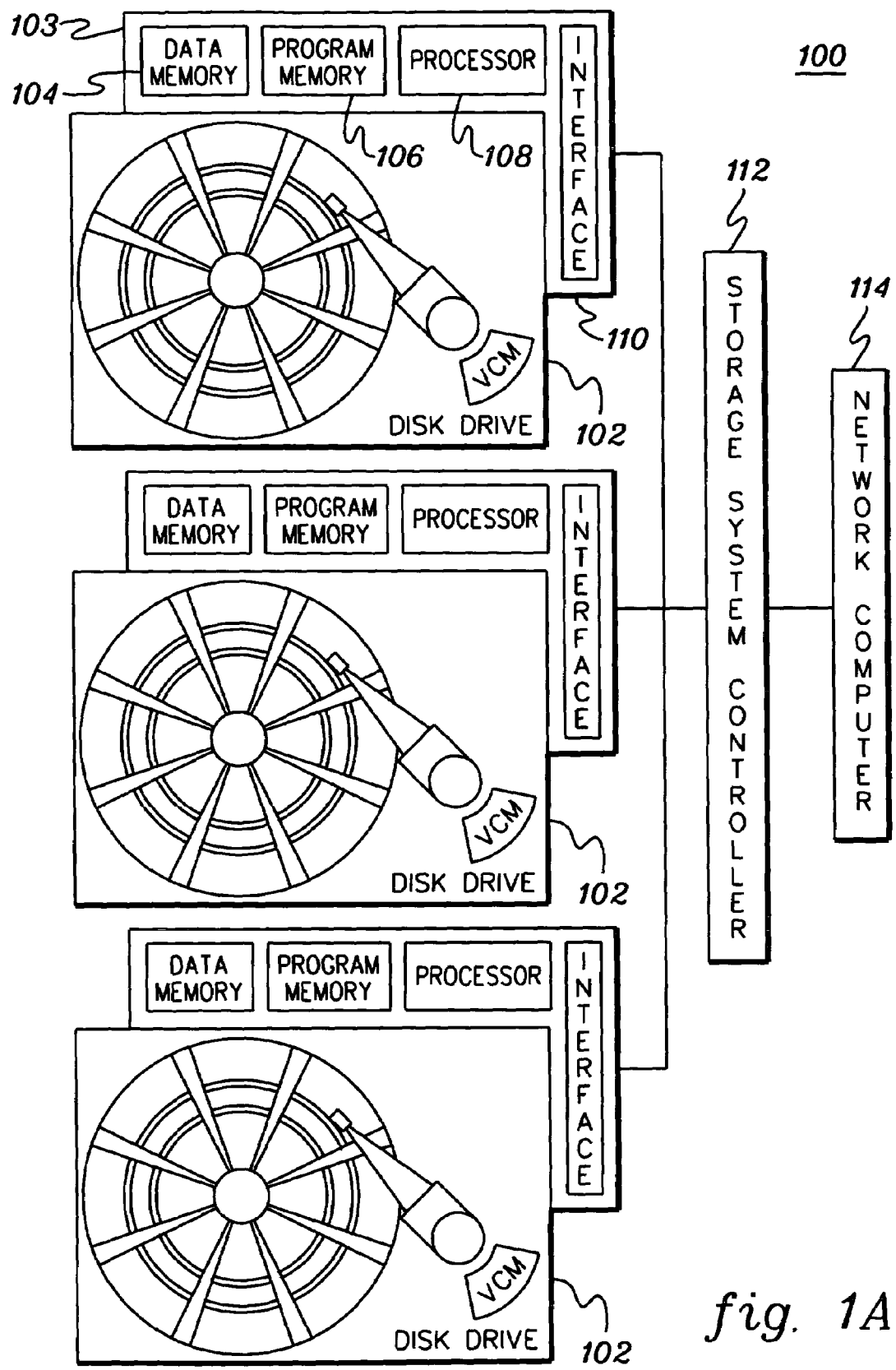
FIG. 1a depicts one embodiment of a storage system incorporating and using one or more aspects of the present invention.

In accordance with an aspect of the present invention, a capability is provided that facilitates the automatic collection of product usage information and the automatic forwarding of data relating to that information to one or more interested entities. In a further aspect of the present invention, automatic analysis of the collected information is also performed.

The product usage information is information obtained, for instance, by actual usage of a product in a real-time or production (i.e., non-test) environment. By collecting this information and forwarding it to the interested entities, changes can be made to the product based on the information. In one embodiment, these changes are automatically made based on the automatically received information.

As examples, a product is a device, component, module, or logic that can be in any one of various technologies or industries, such as in computing, electronics, mechanics, optics, automotive industry, airline industry, etc. Moreover, an interested entity is, for instance, an entity that is responsible for creating, designing, developing, manufacturing, constructing, maintaining the quality, integrating the product and/or the like.

Although the capability being provided herein can be used for a broad spectrum of products in various technologies, industries, etc., for clarity, it is described with reference to storage systems. For example, product usage information, including information regarding various parameters, metrics and/or behaviors associated with storage media (e.g., disk drives of a storage system), is collected, analyzed and disseminated. Thus, an overview of storage systems is provided herein.

Storage systems are an important component of many computing and data processing environments. They provide a broad range of storage capabilities, and include, for instance, storage devices, as well as hardware and software, to provide a reliable and high performing storage system. The evolution of storage systems is described in an article entitled "The Evolution of Storage Systems," by R. J. T. Morris and B. J. Treskowski, IBM Systems Journal, Vol. 42, No. 2, 2003, which is hereby incorporated herein by reference in its entirety. Storage systems are used both in externally attached storage, as well as in embedded systems. A single storage system can include a hundred or more storage devices, such as hard disk drives.

With the development of the RAID (Redundant Array of Independent Disks) technology, the disk drives are configured into one or more logical arrays (e.g., RAID arrays) that provide data storage solutions with a certain amount of reliability and/or performance. A RAID array is formed by splitting or combining physical arrays. A physical array is one or more physical drives randomly grouped to form a physical array. Typically, a RAID configuration uses one physical array, but complex configurations can have two or more physical arrays. Similarly, typically, one logical array corresponds to one physical array. However, a logical array may include multiple physical arrays to allow multiple RAID levels. One or more logical drives are formed from one logical array. These appear to the operating system as regular disk volumes with the RAID controller managing the arrays.

In a RAID system, the data is split and stored across multiple disk drives. This is referred to as striping. Since a RAID array includes multiple drives, performance can be improved by using the drives in parallel. This can be accomplished by splitting the data onto the multiple drives in the array and then using the drives to read back a file when needed. Striping can be done at the byte level or in blocks.

Striping allows RAID arrays to improve performance by splitting up files into pieces and distributing them to multiple hard disks. Most striping implementations allow the creator of the array control over two parameters, which include the stripe width and stripe size. The stripe width refers to the number of parallel stripes that can be written to or read from simultaneously. The stripe width is equal to the number of disks in the array. Read and write performance of a striped array increases as width increases, since adding drives to the array increases the parallelism of the array, allowing access to more drives simultaneously.

The stripe size of the array refers to the size of the stripes written to each disk. As stripe size is decreased, files are broken into smaller pieces. This increases the number of drives storing the data of a file, theoretically increasing transfer performance, but decreasing positioning performance.

Since striping involves no redundancy, there is no data protection in the event of a disk failure. Thus, a data redundancy technique, referred to as parity, may be used with striping to provide data protection. The disadvantages of striping with parity is that the parity bits have to be computed which takes computing power. Also, recovering from a lost drive under parity requires the missing data to be rebuilt. Parity calculates an extra redundant piece of data from the "N" pieces of data which is stored. The "N" pieces of data are typically the blocks or bytes distributed across the drives in the array. The "N+1" pieces of data are stored on "N+1" drives. If one of the pieces of data is lost, the "N+1" pieces of data can be recreated from the "N" that remain, independent of which piece is lost. The parity information is either stored on a separate drive or is mixed with the data across the drives in the array. Parity protects data against any single drive in the array failing without requiring the 100% overhead of mirroring, another redundancy technique.

In a RAID system using mirroring, all the data in the system is written simultaneous to a plurality of (e.g., two) hard disks, instead of one. Mirroring provides 100% data redundancy and provides protection against the failure of either of the disks containing the duplicated data. Mirroring provides fast recovery from a disk failure, since the data is on the second drive and is ready to use if the first one fails.

The fundamental structure of a RAID array is a physical array of storage media, such as storage devices (e.g., disk drives). The number of devices in the physical array and the data format of sharing the data between the devices determines a RAID level. Each RAID level defines a different way to spread data across multiple devices. This usually includes a compromise between cost and speed. Various RAID levels are described below; however, it will be understood by those skilled in the art that there are many other possible levels of RAID arrays.

1. RAID Level 0—RAID Level 0 provides no redundancy. RAID Level 0 splits or stripes the data across drives, resulting in higher data throughput. Since no redundant information is stored, performance is very good, but the failure of any device in the array results in complete data loss. Level 0 is used to increase device performance.
2. RAID Level 1—RAID Level 1 is usually referred to as mirroring. A Level 1 array provides redundancy by duplicating all the data from one device on a second device, so that if either device fails, no data is lost. This is a good entry-level redundant system. The downside of this type of system is that the cost per megabyte of device storage is twice that of a single device, since two drives are needed to store the same data.

3. RAID Level 3—RAID Level 3 stripes data at a byte level across several devices, with parity stored on one device. Byte level striping employs hardware support for good performance. If one disk fails, it is possible to rebuild the complete data set so that no data is lost. If more than one device fails, the stored data is lost. The cost per megabyte is lower then RAID Level 1, but the performance is lower than RAID Level 5.

4. RAID Level 5—RAID Level 5 stripes data at a block level across several drives and distributes parity among the devices. No single device is devoted to parity. This can speed small writes in multi-processing systems. However, since parity is distributed on each device, read performance tends to be slower than other RAID types. If one device fails, it is possible to rebuild the complete data set, so that no data is lost. If more than one device fails, all the stored data is lost. This is a relatively low cost per megabyte technique, while still retaining redundancy.

5. RAID 0+1 or RAID 10—RAID 0+1 or RAID 10 is a combination of RAID levels that utilizes multiple RAID 1 (mirrored) sets into a single array. Data is striped across all mirrored sets. RAID 10 utilizes several devices to stripe data to increase performance and then makes a copy of the striped devices to provide redundancy. Any device can fail and no data is lost, as long as the mirror of that device is still operational. The mirrored devices eliminate the overhead and delay of parity. This level of array offers high data transfer advantages of striped arrays and increased data accessibility. System performance during a device rebuild is also better than that of parity based arrays, since data does not need to be regenerated from parity information, but is copied from the other mirrored device.

6. RAID 0+5 or RAID 50—RAID 0+5 or RAID 50 is a combination of RAID levels that utilizes multiple RAID 5 sets striped in a single array. In a RAID 50 array, a single device failure can occur in each of the RAID 5 sides without any loss of data on the entire array. If, however, more than one device is lost in any of the RAID 5 arrays, all the data in the array is lost. If the number of devices increases in an array, so does the possibility of a single device failure. Although there is an increase write performance in RAID 50, once a device fails and reconstruction takes place, there is a noticeable decrease in performance, data/program access is slower, and transfer speeds on the array are effected.

Additional details regarding RAID arrays are provided in, for instance, Brady et al., U.S. Pat. No. 5,727,144, entitled "Failure Prediction For Disk Arrays," issued on Mar. 10, 1998, and Menon et al., U.S. Pat. No. 5,301,297, entitled "Method And Means For Managing RAID 5 DASD Arrays Having RAID DASD Arrays As Logical Devices Thereof," issued on Apr. 5, 1994, each of which is hereby incorporated herein by reference in its entirety.

A storage system includes a plurality of storage devices configured, for instance, in one of several RAID configurations to provide data storage solutions. One example of a storage system incorporating and using one or more aspects of the present invention is depicted in FIG. 1a. A storage system 100 includes, for instance, a plurality of storage devices 102, such as a plurality of hard disk drives. A storage device includes an electronics card 103 having, for instance, a data memory 104 for storing data, such as program results; a program memory 106 for storing programs to be executed to capture system parameters; a processor 108, such as a Texas Instruments TMS320 C62X or TMS320 C67X digital signal processor, for executing the programs stored in program memory; and an interface 110 (e.g., a SCSI interface) to facilitate communications between the device and a storage system controller 112.

Figure 1B:
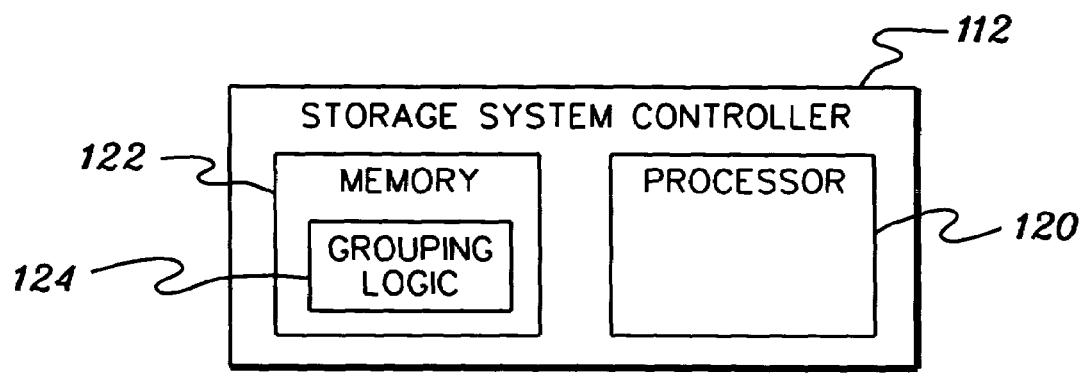
FIG. 1b depicts further details of a storage system controller of the storage system of FIG. 1a, in accordance with an aspect of the present invention.

Storage system controller 112 is responsible for writing data to and reading data from the storage devices. In one example, storage system controller 112 includes a processor 120 (FIG. 1b), such as an Intel Pentium general purpose processor, for executing programs and logic stored in a memory 122. As one example, memory 122 includes grouping logic 124 which is used in accordance with another aspect of the present invention to group storage media into one or more groups of media based on information obtained regarding the media. Storage system controller 112 is further coupled to one or more network computers 114 (FIG. 1a), such as an IBM ISERIES MODEL 800 server or INTELLISTATION Z PRO PC, that stores data on and retrieves data from the storage devices.

In one example, a plurality (e.g., all or a subset) of the storage media of the storage system are grouped into one or more groups of media. These groups are, for instance, physical arrays which are further grouped into logical arrays, examples of which are RAID arrays. One embodiment of the logic associated with grouping storage media into one or more groups is described with reference to FIG. 2.

Initially, parameter information is obtained for a storage medium (e.g., a storage device, such as a disk drive) of the storage system, STEP 200. This parameter information includes, for instance, measurements taken for one or more parameters associated with an individual storage device and/or it includes data obtained or provided regarding the device. Further details regarding various parameters are described below.

As one example, the parameters are categorized into five categories including, for instance, location, servo, operation, environmental and parametrics. Each of these categories is described with reference to one example of a storage device, which is a disk drive. Description of each category may vary for other types of devices. Further, there can be other categories, and/or a category may have more, less or different parameters associated therewith.

(1) Location provides a history of the residence time of the head as a function of cylinder for each drive in the system.

(2) The servo parameters provide information on servo errors which occur during operation. This information includes faults that occur in detecting the servo signal including, for instance, no servo interrupt, which indicates one or more expected servo fields were not detected; servo unlock, which indicates that several consecutive no servo interrupts have occurred; write inhibit which indicates that the servo has reported the head is off track, and therefore, the drive should not write data; and a seek time error, which indicates the seek to a track was not completed within an expected time limit. In addition, the seek time performance can be measured.

(3) The operation commands provide information about drive functions including, for instance, the workload given by operations/sec, defective sectors, head sweep operations and load/unload events. For load/unload events, disk drives with load/unload ramps unload the heads from the disk surface when the drive is powered off. During startup, the system loads the heads onto the disk by issuing a load command. In the event that the servo system loses lock and is unable to identify its track location, the disk drive processor may issue a load command to reinitialize the system. During a servo unlock, the location of the actuator which positions the head is unknown and in certain circumstances the actuator may have performed an uncontrolled seek which could damage the head or disk. A measure of how often this situation occurs can be determined by logging the number of load commands and unload commands and calculating a difference between them. The difference can be used as a measure of probable damage and/or failing operation.

(4) Environmental conditions of the hard disk drive including, for instance, shock events, vibration, temperature and humidity.

(5) Drive parametrics which provide information on the state of the internal drive components including, for instance, head flyheight; non-repeatable runout (NRRO) of the head to track motion, which provides information about the spindle bearing performance and other mechanical components; repeatable runout (RRO) of the head to track motion, which provides information on disk slip after manufacture and other repeatable forces on the actuator; data disk defects; thermal asperities; read head amplitude; and resolution and read head error rates.

These parameters can be measured initially when the drives are put into the storage system. At the time of manufacture of the drive, a number of these parameters are measured and may be stored in a reserved area of the disk to be used at the time of manufacture. Environmental conditions during shipment may also be taken and used in the initial configuration.

There are various ways in which the parameter information is obtained. In one example, the parameter information is obtained via a storage device monitor program residing in program memory 106 (FIG. 1a). The program is executed by processor 108, which captures and stores a set of disk drive parameters into memory 104 (e.g., a data buffer). The monitor program records a predetermined set of parameters, while it is receiving and executing commands from system controller 112 through drive interface 110. For example, when an error or event occurs, a flag is set, the error or event is captured by the processor and the processor logs the error or event. While many of the parameters are recorded during the normal operation of the drive, a subset of parameters, such as Flyheight, non-repeatable runout (NRRO) and repeatable runout (RRO), are performed by halting the normal drive operation and executing those parametric measurements, which takes several seconds. When memory 104 approaches a filled state, the data is written from the memory to a reserved area on the disk drive not used for data storage, which includes one or more data tracks. The data stored on the reserved data tracks is retrieved at predetermined intervals (e.g., each 12 hours) by the storage system controller through the drive interface and sent to computer 114 on the network for subsequent data processing. In this manner, the parameters are monitored with minimal interference with the normal operation of the storage system controller.

In another example, a known technology, referred to as Self-Monitoring Analysis and Reporting Technology (SMART) may be used to obtain data regarding various parameters. SMART is described in an article entitled, "Self-Monitoring Analysis and Reporting Technology," by Charles M. Kozrerok, The PC Guide (http://www.PCGuide.com), Apr. 17, 2001, which is hereby incorporated herein by reference in its entirety. This article is not only available on the internet, but is also available by purchasing a CD-Rom through www.PCGuide.com. In this example, storage system 112 interrogates the disk drive by sending a command to the disk drive, the drive then returns the value of the requested parameter which is stored in storage system controller memory 122.

Other details regarding obtaining parameter information are provided in Brady et al., U.S. Pat. No. 5,727,144, entitled "Failure Prediction For Disk Arrays," issued on Mar. 10, 1998, which is hereby incorporated herein by reference in its entirety.

Returning to FIG. 2, subsequent to obtaining the parameter information for the storage medium, a determination is made as to whether there are more media for which parameter information is to be obtained, INQUIRY 202. If there are more media, then processing continues with STEP 200. Otherwise, a grouping criterion is selected, STEP 204. Examples of grouping criterion include, for instance, grouping based on performance, reliability, a combination of both and/or other criteria. The selected grouping criterion is indicated to the storage controller, which in the embodiments described herein, has the responsibility for performing the grouping. For example, the storage controller includes the grouping logic.

Thereafter, the media are grouped into one or more groups based on the criterion and the obtained information, STEP 206. In one example, the media are grouped into groups by identifying to the storage controller the media that are a part of a particular group. This identification is stored, for instance, in memory 122 of the storage controller. The number of media in each group may depend on a variety of factors including, for instance, how many media there are; the desired number of media in each group; and/or the resultant RAID level to be configured using the groups. Other examples also exist.

There are numerous ways in which the parameter information can be used for grouping of media into groups, such as physical arrays. Two examples include grouping based on performance and grouping based on reliability. Each of these examples is described in further detail below.

Storage media may be grouped into one or more groups based on individual performance measurements. The performance, reliability and availability of data stored in a physical array is dependent upon the individual performance of the storage devices deployed in the array. Thus, to optimize the overall storage system, performance information (e.g., measurement data) is obtained for each individual storage device to be deployed in the system and is used to assign the device into a group. As one example, storage devices, such as disk drives, may be assigned to physical arrays based on individual drive performance measurements. Performance of an individual disk drive depends, for instance, upon the average access time, which includes the seek and latency of a particular drive, as well as the frequency of drive errors, which result in the drive failing to execute a command on the first attempt or repeated attempts. Such command errors include, for instance, write inhibits, no servo interrupt, servo unlock, and seek time out, all of which degrade performance objectives. Each of these parameters, therefore, can be measured and used to quantify the performance of a particular hard disk drive. A rate for each of these parameters may be determined by dividing the number of errors by the number of operations in a prespecified time interval (e.g., one hour). The rate may be dependent on the absolute number of operations/second the drive is executing.

Figure 3:
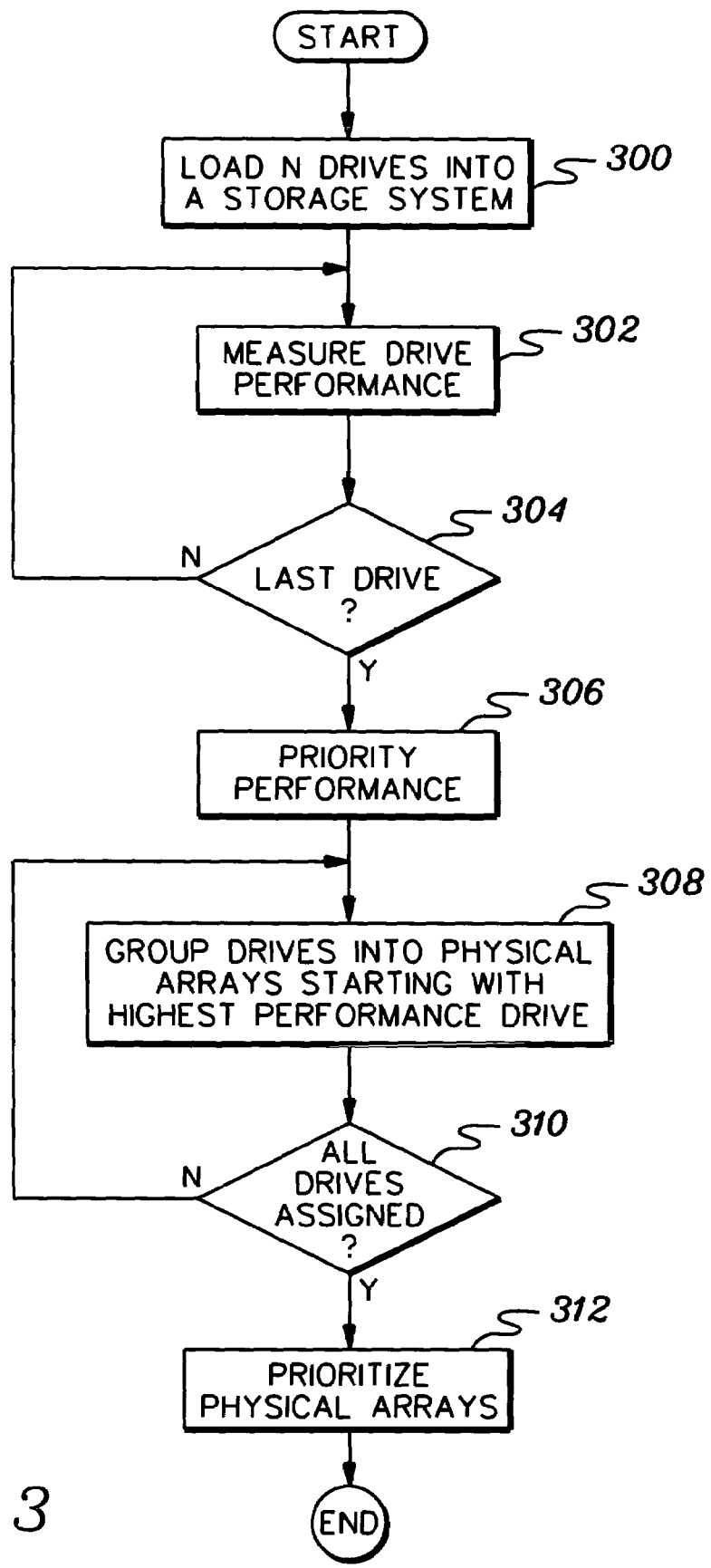
FIG. 3 depicts one embodiment of the logic associated with grouping drives into physical arrays based on performance, in accordance with an aspect of the present invention.

One embodiment of the logic associated with grouping storage media based on performance is described with reference to FIG. 3. In this example, the storage media includes storage devices, such as disk drives. However, this is only one example. Other media may also be grouped.

Initially, a desired number of drives is loaded into the storage system, STEP 300. Then, a drive is selected and the performance of that drive is obtained, STEP 302. For example, the performance of the drive is measured. An example of determining a performance metric using various performance parameters includes the following:

Performance Metric=Avg Seek Time+Avg Latency+$a$× Write Inhibit Rate×(Avg Latency)+$b$×No Servo Interrupt Rate×(Avg Latency)+$c$×Servo Unlock Rate×(Avg Seek Time+Avg Latency)+$d$×Seek Time Out Rate×(Time Out Interval+Avg Seek Time+Avg Latency), Where a, b, c, d are weighting factors and have a value in any relative range, such as, for instance, from 0 to 1 or 0 to 100; seek time is a provided value; and the rates are determined, as described above.

An example of some typical drive parameters include, for instance:
Rotational Speed 7,200 RPM
Read Seek Time (Average) 8.9 ms
Write Seek Time (Average) 10.9 ms (average)
Track-To-Track Seek Time 2.0 ms (average)
Full Stroke Seek 21.0 ms (average)
Average Latency 4.2 ms.

Further, an example of some drive error rates include, for instance:
Write Inhibit Rate=0.1
No Servo Interrupt Rate=0.01
Servo Unlock Rate=0.25
Seek Time Out Rate=0.01.

The above metric is only one example. Many combinations of parameters or even a single parameter may be used in creating a performance metric for the drive. Other performance metrics may include more, less and/or different parameters.

Subsequent to obtaining a performance metric for the drive, a determination is made as to whether this is the last drive in which measurements are to be obtained (e.g., the last drive of the loaded drives or the last drive of a subset of the drives, as desired), INQUIRY 304. If it is not the last drive for which measurements are to be obtained, then processing continues with STEP 302. However, if it is the last drive, then the drives are prioritized based upon drive performance, STEP 306.

Thereafter, in one example, the drives are grouped into groups (e.g., physical arrays) starting with, for instance, the highest performance drive, STEP 308. A decision is made as to whether all the drives to be assigned have been assigned to an array, INQUIRY 310. If all the drives have not been assigned, then processing continues with STEP 308. Otherwise, processing continues with STEP 312. At STEP 312, the physical arrays are prioritized. This allows the identification and selection of those arrays with the highest performance. Thus, if a logical array (e.g., a RAID array) is to be configured based on performance, then the physical arrays with the highest priority are selected first. A logical array can correspond to one physical array, or it can be formed by splitting or combining physical arrays, depending on the desired RAID level.

Additionally, in one example, the storage system is notified of which arrays have the highest performing drives and data which is most frequently accessed is loaded onto those arrays. The storage system can autonomically determine which data is more frequently accessed and reallocate the data to arrays with the best performance, as described herein.

In a further example, grouping of the storage media may be based upon the reliability of each medium to minimize the probability of data loss for a storage system. One way to represent the reliability is to use the probability of having no failure within a certain length of time. The reliability of a system is a function of the reliability of its components. For example, for a system without redundancy, data loss occurs when at least one medium fails. In this case, the reliability of a system with N components having the reliability of $p_1$, $p_2, \ldots, p_N$ is the product of the component reliability:

$$R_1 = p_1 p_2 \ldots p_N.$$

This system reliability is smaller than the reliability of each component, and decreases a more components are added. For a system that loses data only if two or more media fails within a certain time period, the system reliability is:

$$R_2 = R_1 + R_1[(1-p_1)/p_1 + (1-p_2)/p_2 + \ldots + (1-p_N)/p_N].$$

Similarly, the reliability of a system having more than two media can be obtained as a function of the components reliabilities. Hence, if the component reliabilities are predicted, the system reliability can also be predicted.

Given failure occurrence data, the component reliability can be predicted based on the monitored parameters that are measured from the component or the system. There can be a number of parameters that may be related to the reliability. The potential relationship can be assessed based on data. Then, a statistical modeling produces a prediction equation that relates the component reliability to the relevant parameters.

For an example of a storage medium, such as a disk drive, many parameters may be considered to be related to the component reliability. Examples are NRRO on multiple surfaces; the flyheight of each head to determine the margin of operation; and the thermal asperity rate for each surface. Operating parameters such as, for instance, write inhibits, servo unlocks, and/or load/unload events may be related to storage media reliability. For example, the NRRO of head to track motion may vary from surface to surface, e.g., the highest NRRO of the head to track motion occurs on the disk surface within a disk stack which is located nearest the spindle bearing with the highest mechanical bearing NRRO. In yet another example, the NRRO of the head to track motion may be analyzed in the frequency domain to provide information on individual mechanical components in the disk drive. Particular frequencies in the head to track NRRO frequency spectrum can be identified as due to, for example, motor spindle bearings, head suspension resonances, baseplate resonances, etc.

Environmental factors and the usage/activity patterns may also be useful in modeling and predicting the component reliability. Shock events and temperature readings are examples of the environmental parameters that can be monitored. The frequency or rate of the commands, as well as the cumulative times the drive accesses a head and cylinder, provides a history of the pattern usage. Such cumulative times may also include the total time a head spends flying on individual data cylinders, or the number of write cycles the head performed on individual data cylinders. These parameters are included in the statistical reliability modeling, and can be incorporated into the prediction equation.

Figure 4:
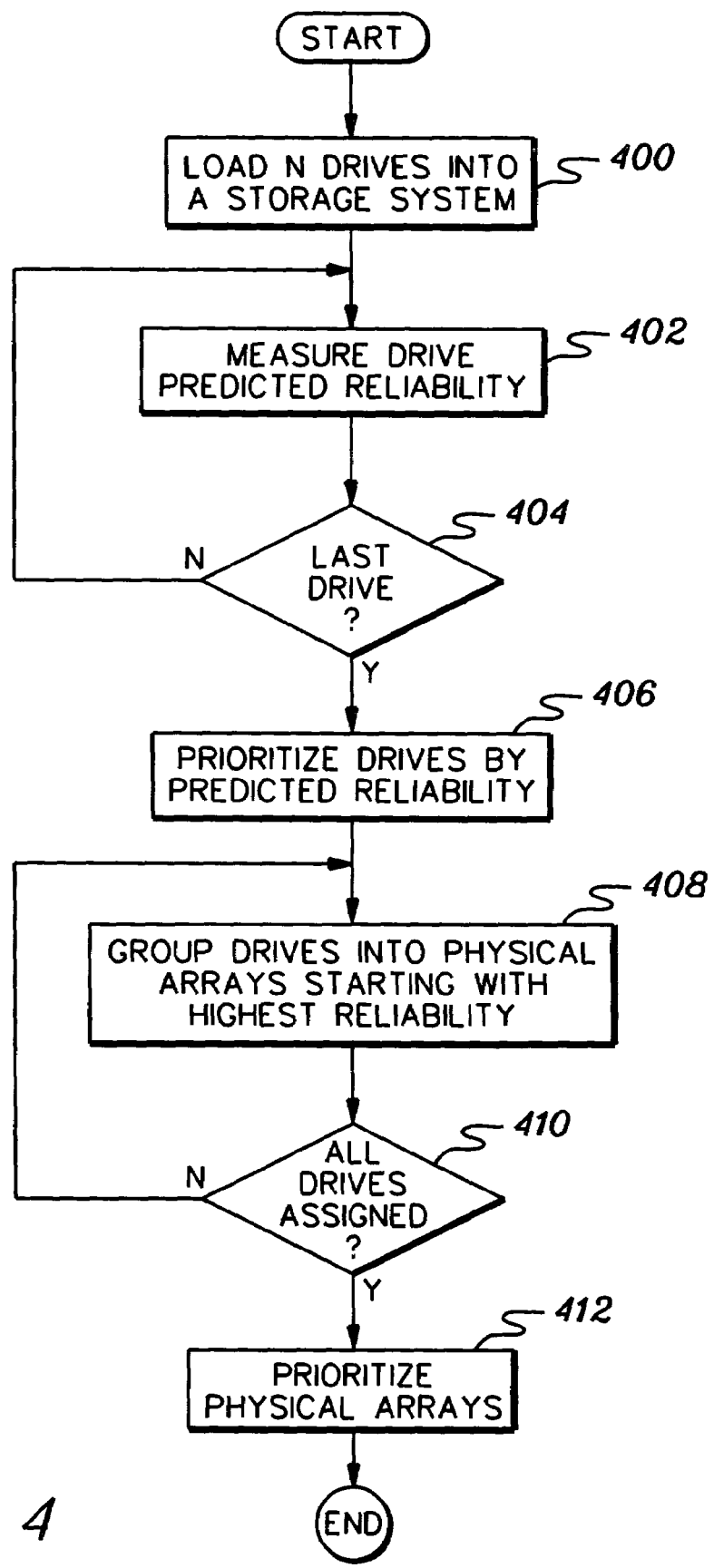
FIG. 4 depicts one embodiment of the logic associated with grouping drives into physical arrays based on reliability, in accordance with an aspect of the present invention.

One embodiment of the logic associated with grouping storage media based on reliability is described with reference to FIG. 4. Again, this example is described with reference to storage devices, such as disk drives, but this is only one example.

Initially, a desired number of drives are loaded into the storage system, STEP 400, and one or more parameters of each drive are measured and monitored. The parameters are then used in a prediction equation to obtain the predicted reliabilities of the drives, STEP 402.

One example of a prediction equation expresses the natural logarithm of the reliability odds (where odds is defined as the reliability over 1—reliability) as a linear function of the parameters. For the component reliability in a specified length of time, the parameter values prior to that time period can be used as in:

Log reliability odds=$a$×($NRRO$−(10% of Track Pitch))+$b$(Nominal Flyheight−Measured Flyheight)+$c$×Thermal Asperity Rate+$d$×Write Inhibit Rate+$e$×Servo Unlock Rate+$f$×(Load events−Unload events)+$g$.

Here, the coefficients (including the additional constant g) are real numbers estimated from the data using, for example, statistical logistic regression analysis. One example of statistical logistic regression analysis is described in "Applied Logistic Regression," by David W. Hosmer and Stanley Lemeshow, 2000, J. Wiley, which is hereby incorporated herein by reference in its entirety.

The above metric is only one example. Many different combinations of parameters, even a single parameter, or forms of the above equation may be used in creating a metric of predicted reliability. Other reliability metrics may include more, less and/or different parameters than those described above. For example, environmental conditions and/or usage patterns may be considered. Other examples also exist.

Subsequent to obtaining a reliability metric for the drive, a determination is made as to whether this is the last drive for which measurements are to be obtained (e.g., the last drive of the loaded drives or the last drive of a subset of the drives, as desired), INQUIRY 404. If it is not the last drive for which measurements are to be obtained, then processing continues with STEP 402. However, if it is the last drive, then the drives are prioritized based upon drive reliability, STEP 406.

Thereafter, in one example, the drives are grouped into one or more groups, such as physical arrays, starting with the highest reliability drive, STEP 408. A decision is made as to whether all the drives to be assigned have been assigned to a group, INQUIRY 410. If all the drives have not been assigned, then processing continues with STEP 408. Otherwise, processing continues with STEP 412. At STEP 412, the groups or physical arrays are prioritized. This allows the identification and selection of those arrays with the highest reliability. Thus, if a RAID array is to be built based on reliability, then the physical arrays with the highest priority are selected first.

In one example, the storage system is notified which arrays have the highest reliability, and then data which is most critical is loaded onto the arrays with the highest reliability. Further, in one embodiment, periodically, reconfiguration takes place to move data from less reliable arrays to more reliable arrays, as described below.

Other grouping techniques are possible. For example, a technique may be provided that spreads low reliability drives across arrays, so that one array is, for instance, a 50/50 mix of high reliability and low reliability drives. In that way, arrays will not be configured of 100% low reliability drives. Alternatively, the system can configure arrays with 100% reliable drives for critical data and 100% low reliable drives for non-critical data. Other percentages may also be used in combination with identifying critical data. Other percentages may also be used in combination with identifying critical data. For drives of low reliability, the system could recommend scheduled replacement and/or could implement write verify as an added reliability measure for drives of very low reliability.

A write verify operation is used, for instance, if a metric of a disk drive reaches a preset limit, since it is possible that the drive may be approaching a failure limit. To further verify the state of the drive, the system controller requests that the drive perform a write verify operation which means that after data is written it is then read back and compared to the written data to be sure the system has recorded the information correctly. Typically, this is not done during normal operation due to the time penalty. However, if the drive reliability metric has reached a preset limit, this allows the system to provide further data safety by verifying that the data is written correctly, and also to obtain further information on system failures by detecting write failures. Other corrective actions may also be taken when predictions of reliability reach preset limits, such as in the case of a high NRRO on a particular surface, the system may choose to write data to other better performing surfaces. Also for head to disk interactions indicated by thermal asperities, the system can increase the rate of disk sweeps to attempt improvement. In a further example, if another preset limit is exceeded, the system controller can notify the operator to replace a disk drive.

In yet another grouping technique, some media may be grouped based upon one criteria, such as performance, while another set of media is grouped based upon another criteria, such as reliability. Moreover, other criteria may be used.

As a further example, arrays can be produced which optimize either one of the performance or reliability attributes. Then, data which is frequently accessed is stored on the high performance drives of the array and data which is critical is stored on the high reliability drives of the array. As yet a further example, a configuration may be selected based upon the drive measurements. For example, low reliability drives may be put into a RAID 50 configuration to provide an extra level of data reliability and a high reliability drive may be used in a RAID 5 configuration.

Figure 5:
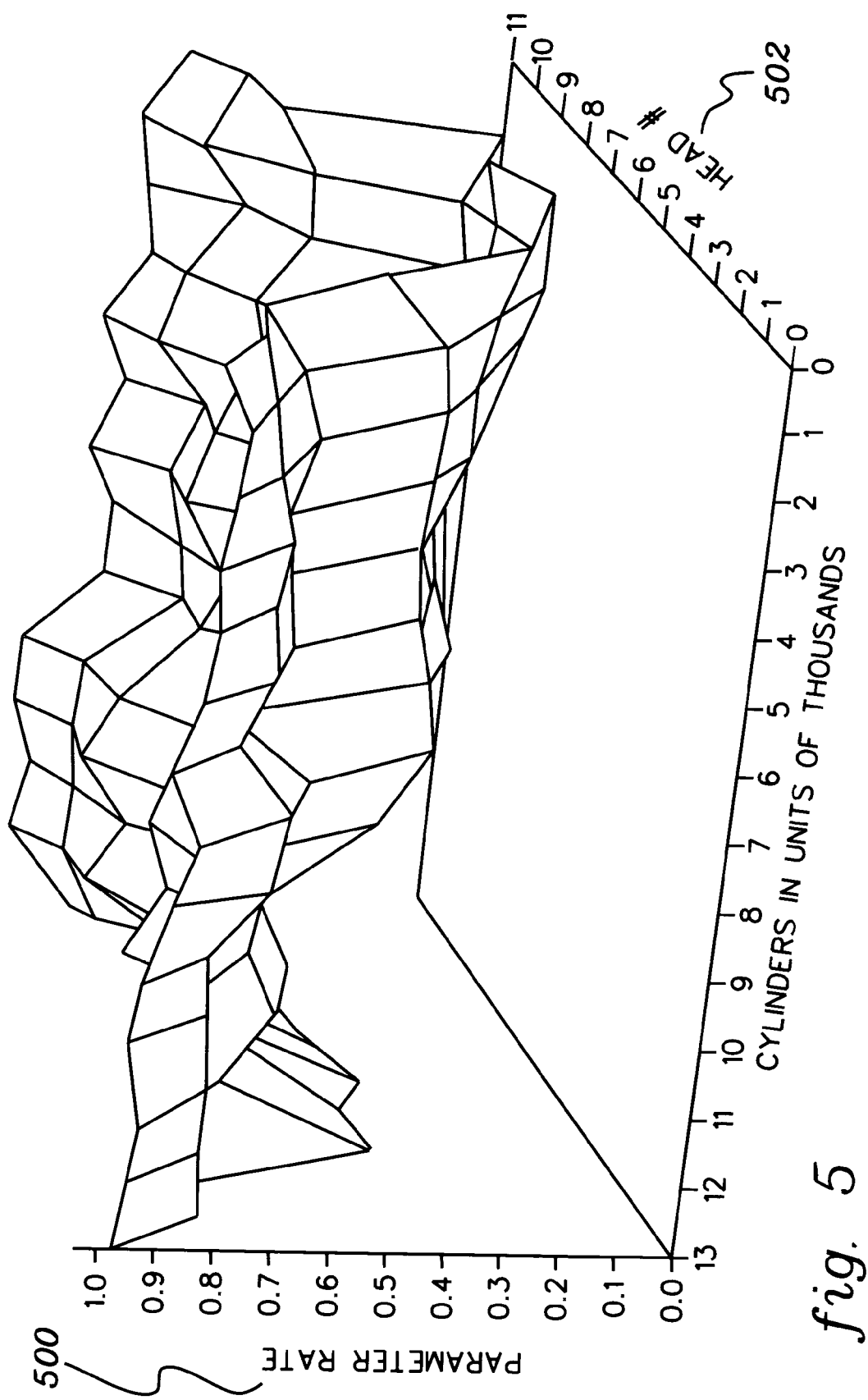
FIG. 5 depicts one example of write inhibit rates varying based on data recording surface, as used in accordance with an aspect of the present invention.

In yet another embodiment, since there are significant variations within a disk drive itself (see FIG. 5), it is further possible to optimize the storage system based on the recording surfaces of the disk drives. As shown in FIG. 5, the write inhibit rate 500 for this particular disk drive is dependent upon the data recording surface 502. For example, the write inhibit rate is much higher on certain recording surfaces, for example, head numbers 0 and 11. Thus, by measuring the performance or reliability on each recording surface of a disk drive, it is possible to select individual surfaces within the storage system to group into physical arrays. This would address the surface to surface variations observed in a drive.

Figure 6:
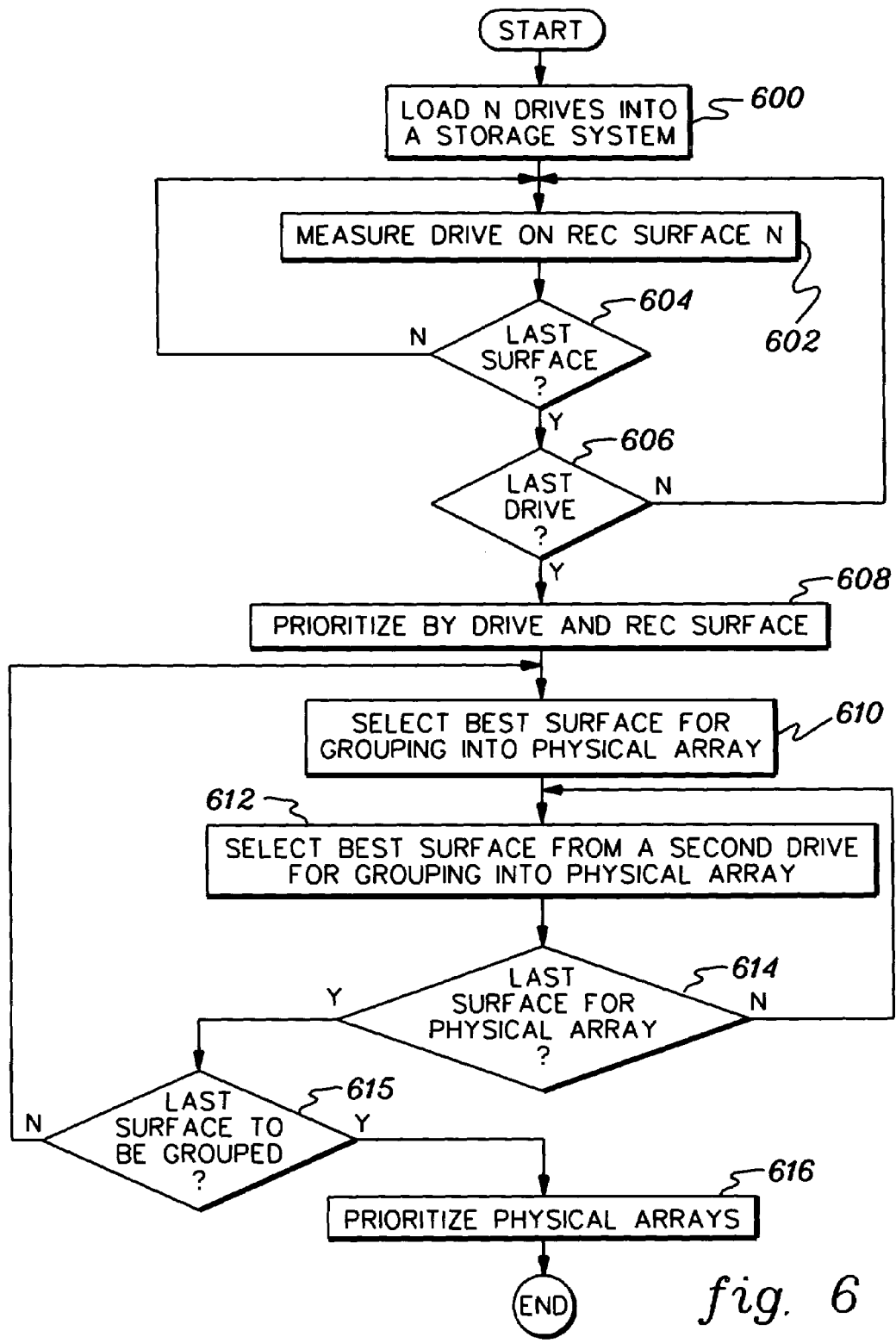
FIG. 6 depicts one embodiment of the logic associated with grouping surfaces of disk drives into groups, in accordance with an aspect of the present invention.

One embodiment of the logic associated with the grouping of individual surfaces of disk drives is described with reference to FIG. 6. Again, surfaces of disk drives is only one example. Grouping of surfaces of other media is also possible.

Initially, a number of drives is loaded into the storage system, STEP 600. Then, a recording surface on one of the drives is selected and parameter information (e.g., measurements) for that surface is obtained, STEP 602. The measurements to be obtained are based, for instance, on the criteria being used for the grouping (e.g., performance, reliability, and/or other criteria), and the manner in which these measurements are taken is similar to that described above.

Thereafter, a determination is made as to whether this is the last surface of the selected drive, INQUIRY 604. If this is not the last surface on the drive, then processing continues with STEP 602. Otherwise, a further determination is made as to whether this is the last drive for which parameter information is to be obtained, (e.g., last drive of the loaded drives or last drive of a subset of drives, as desired), STEP 606. If this is not the last drive, then processing continues with STEP 602. Otherwise, processing continues with STEP 608. At STEP 608, prioritization by drive and recording surface is performed. This includes, for instance, providing a list of surfaces with an indication of their corresponding drives in priority based on the selected criteria.

Thereafter, the best surface is selected and grouped into a group (e.g., physical array), STEP 610. Then, the best surface from the second best drive is selected for grouping into the physical array, STEP 612. Subsequently, a determination is made as to whether this is the last surface for this physical array, INQUIRY 614. This is dependent on, for instance, the desired number of surfaces to be included in an array. If not, then processing continues with STEP 612. If, however, this is the last surface for this array, then processing continues with a further determination as to whether this is the last surface to be grouped, INQUIRY 615. If there are more surfaces to be grouped, then processing continues with STEP 610. Otherwise, processing continues by prioritizing the physical arrays, STEP 616.

Figure 7:
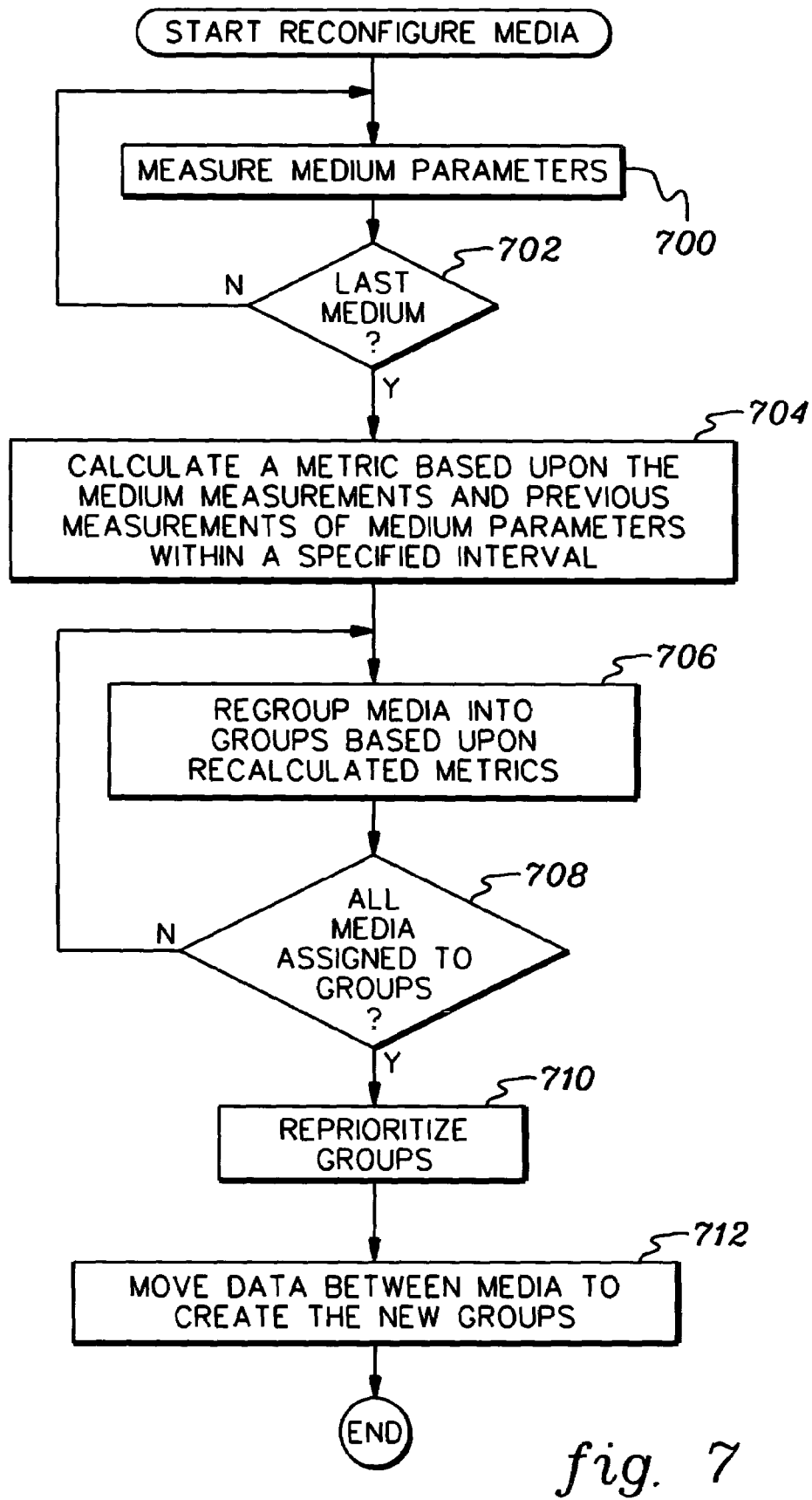
FIG. 7 depicts one embodiment of the logic associated with reconfiguring groups of storage media, in accordance with an aspect of the present invention.

Measurement data for the storage media (e.g., drives, surfaces, etc.) may be obtained periodically to recheck the performance, reliability and/or other metrics. Then, if a medium has changed from its initial criteria (e.g., a low performing medium is in a high performance array, a low reliability medium in a highly reliable array, etc.), reassignment can occur. One embodiment of the logic associated with reassigning or reconfiguring storage media is described with reference to FIG. 7.

Initially, a storage medium is selected and one or more parameters for that medium are obtained, STEP 700. The parameters to be measured are dependent, for instance, on the grouping criteria being selected. Thereafter, a determination is made as to whether this is the last storage medium for which measurements are to be obtained, INQUIRY 702. If not, processing continues with STEP 700. Otherwise, processing continues with STEP 704.

At STEP 704, a storage medium metric is calculated. This metric includes the storage medium measurements obtained in STEP 700, as well as the previously obtained measurements within a specified interval (e.g., one hour, one week, etc.), STEP 704. As examples, the metric is calculated by adding the measurements, or in another example, by using a weighted sum that places more emphasis on, for instance, the recent measurements. Thereafter, the media are regrouped into one or more different groups based on the recalculated metric, assuming regrouping is necessary or desired based upon the recalculated storage medium metric, STEP 706. This regrouping includes, for instance, providing the storage controller with updated identifications of the storage media in the different groups.

Subsequently, a determination is made as to whether all of the storage media have been assigned to a group, INQUIRY 708. If all the media have not been assigned to a group, then processing continues with STEP 706. However, once the media have been assigned, a reprioritization of the groups is performed, STEP 710. Again, this is assuming that regrouping is performed. Data is then moved between storage media to create the new groups, if needed, STEP 712. In one example, this moving includes having the storage controller read the data from one medium and write it to another medium. A temporary storage medium can be used to store the data, while the data is moved between media.

Figure 8:
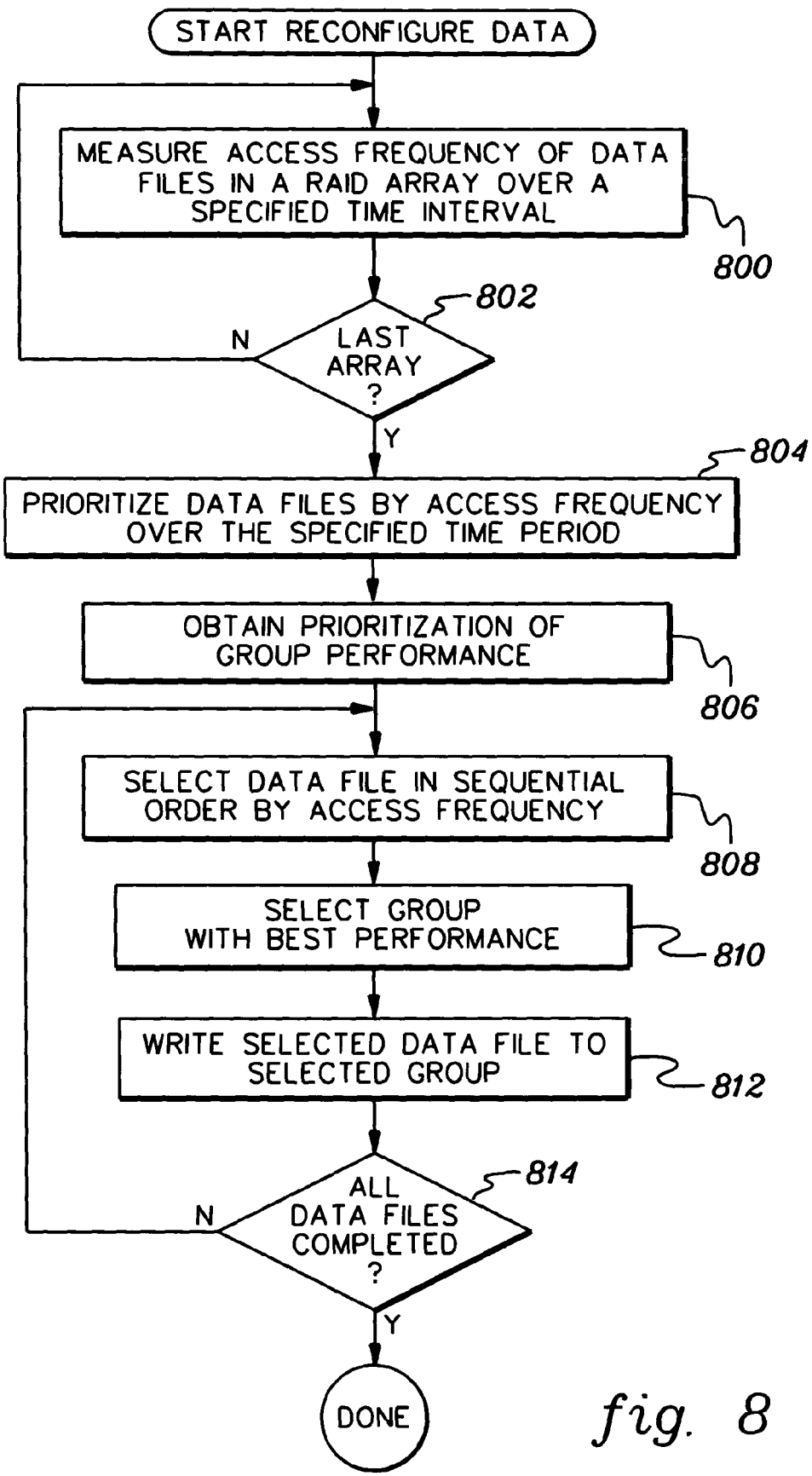
FIG. 8 depicts one embodiment of the logic associated with reconfiguring data, in accordance with an aspect of the present invention.

In another embodiment, data between the storage media (e.g., drives, surfaces, etc.) can also be reconfigured. One embodiment of this reconfiguration is described with reference to FIG. 8. Initially, a RAID array is selected and the access frequency of data files in the selected array over a specified time interval (e.g., one hour, one week, etc.) is obtained, STEP 800. In one example, this is obtained by logging how often the system controller requests to read or write a particular data file.

Thereafter, a determination is made as to whether this is the last array for which access frequency is to be obtained, INQUIRY 802. If this is not the last array, then the access frequency for the next array is obtained, STEP 800. However, if it is the last array, then the data files are prioritized by access frequency over the specified time period, STEP 804. Additionally, the prioritization of group performance is obtained, STEP 806. In one example, this prioritization is obtained from executing the logic of FIG. 3.

Thereafter, a data file is selected in sequential order by access frequency, STEP 808, and a group with available storage and the best prioritized performance is next selected, STEP 810. The selected data file is then written to the selected physical array, STEP 812. Subsequently, a determination is made as to whether all the desired data files have been processed, INQUIRY 814. If not, then processing continues with STEP 808. Otherwise, the reconfiguration of the data between the storage media is complete.

Described above are examples of reconfiguration. Reconfiguring may be performed, for instance, for surfaces and/or drives.

In a further aspect of the present invention, data stored on the same surface can be reconfigured based upon the performance of each individual surface and cylinder, as shown in FIG. 5 for write inhibit rate. Data which is accessed most frequently can be moved to the best performing cylinders of the disk drive. Further, moving data within cylinders and surfaces can be performed within the same drive.

Although the above reconfiguration of data is based on performance, similar logic can be employed to base the reconfiguration on other criteria, such as reliability.

In yet a further embodiment, the storage system monitors the various parameters and keeps a history of the parameters, as well as the drive failures. This is valuable since the parameters can be statistically analyzed, and their differences can be statistically expressed in terms of the make, model, and manufacturing vintage of a disk drive. The model and manufacturing date information can also be incorporated into the performance and reliability metrics. This allows a storage system with different drive types to utilize the type information in configuring itself based on the performance and/or reliability metric.

A storage system may also include a database of drive serial numbers and additional information which can be communicated to other systems such that a shared knowledge of drive failures between systems would allow a global optimization of drive failures. This data may also be communicated to an interested entity, such as, for instance, the manufacturer of the storage devices, to take corrective actions. This is described in further detail below.

In accordance with an aspect of the present invention, a capability is provided that facilitates the automatic collection of product usage information for one or more products. As described above, a product is, for instance, a device, component, module, logic or the like of any one of various technologies or industries. A product is further described with reference to FIG. 9.

Figure 9:
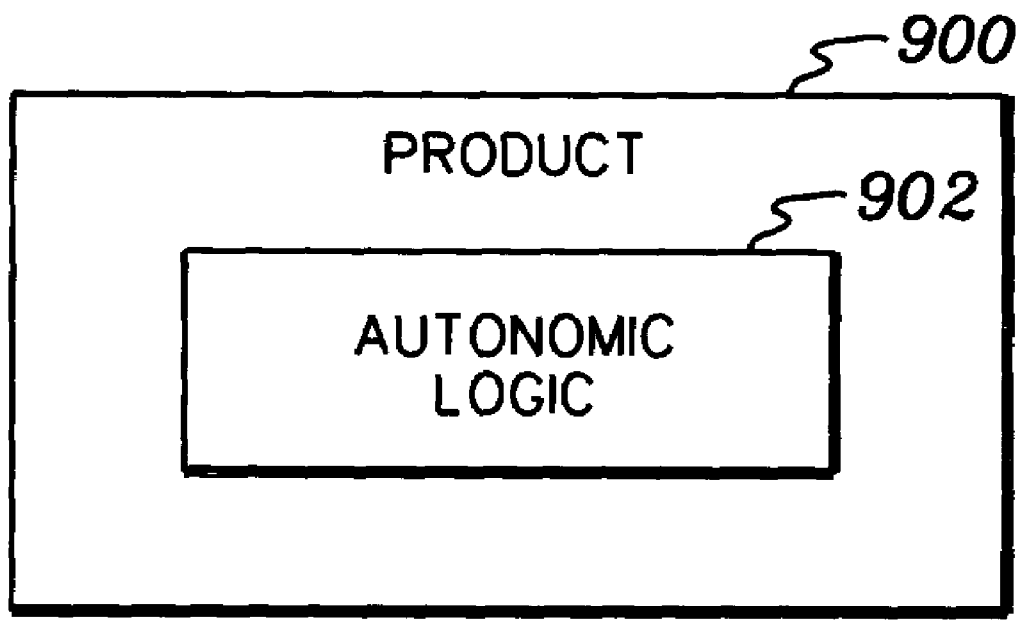
FIG. 9 depicts one embodiment of a product including autonomic logic used in accordance with an aspect of the present invention.

Referring to FIG. 9, a product 900 includes, for instance, autonomic logic 902 that automatically monitors usage of the product. It monitors, for instance, one or more parameters of the product as the product is used. For example, a storage device includes autonomic logic, such as a storage device monitor program, that monitors and logs certain events. This self-monitoring allows information to be gathered relating to actual usage of the product.

This information is collected from products in a local environment and/or from products in a global environment. For example, Company X wishes to obtain information regarding storage systems. Company X is in its local environment and product usage information is obtained for the storage media of that environment. Further, Company Y also has product usage information regarding storage media that is local to Company Y, but considered global to Company X. The global information is automatically collected by Company X, as well as the local information. This collective information may be analyzed by Company X, disseminated by Company X and/or used by Company X, as described in further detail below.

Figure 10:
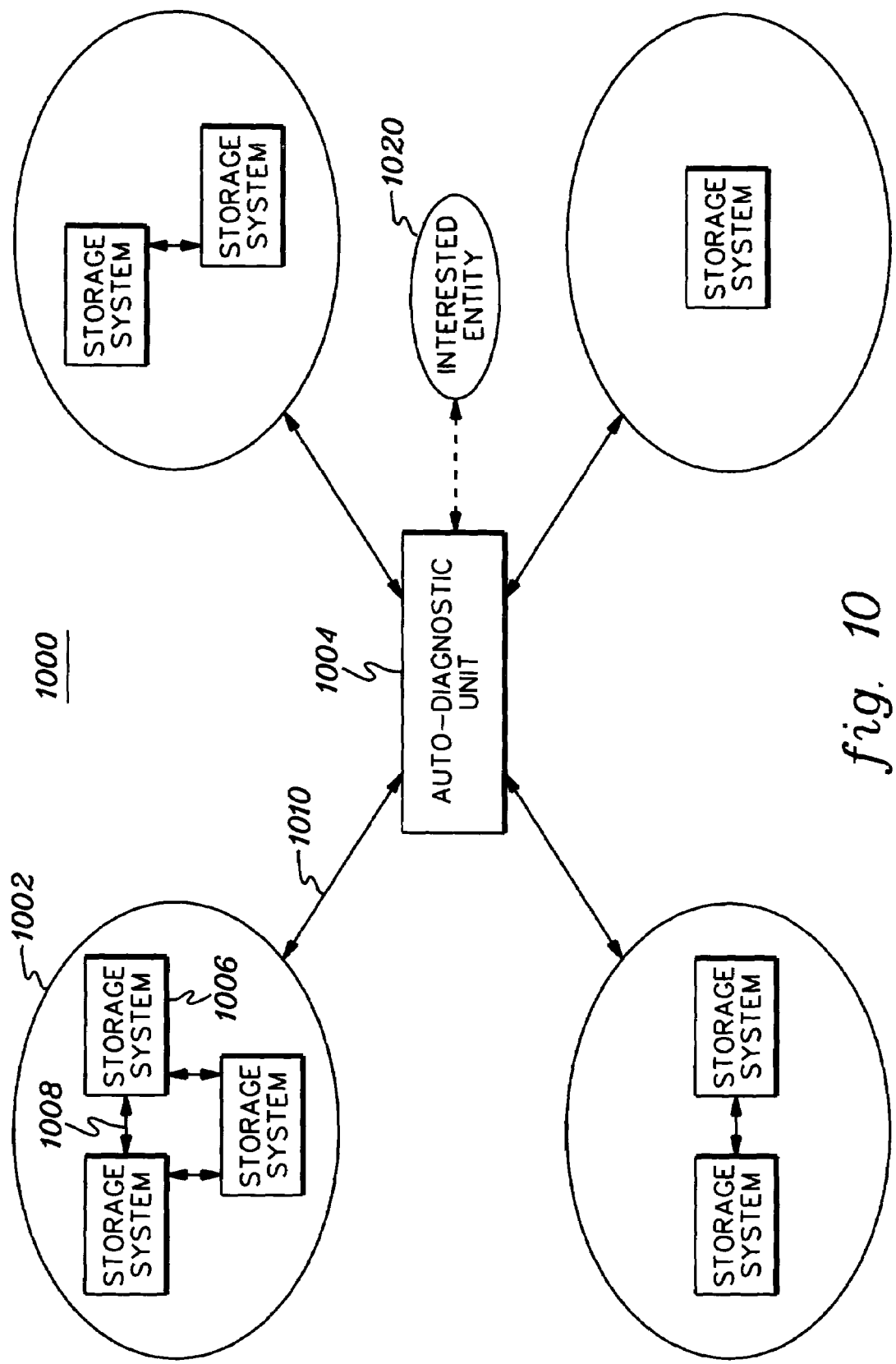
FIG. 10 depicts one embodiment of a global environment incorporating and using one or more aspects of the present invention.

One embodiment of an environment including and using the autonomic capability of the present invention is depicted in FIG. 10. Again, this example is with reference to storage systems, but this is only one example. As shown in FIG. 10, an environment 1000 includes a plurality of storage system complexes 1002 coupled to an auto-diagnostic unit 1004. A storage system complex 1002 includes, for instance, one or more storage systems 1006 coupled to one another via a connection 1008, such as a local area network (using, for example, Ethernet). The storage system complex is coupled to auto-diagnostic unit 1004 via a connection 1010, such as a wide area network (using, for example, telephone lines, radio waves, etc.). Although one auto-diagnostic unit is depicted in FIG. 10, it will be apparent to those skilled in the art that one or more such units may be used to provide one or more aspects of the present invention.

In one example, auto-diagnostic unit 1004 is a processing unit, such as an IBM server, and is responsible for collecting information from storage system complexes 1002. In further embodiments, it also analyzes the information and provides data regarding the analysis (e.g., summaries) back to the storage system complexes and/or to one or more other interested entities 1020. In one example, the one or more interested entities include, for instance, the manufacturers of the storage media.

Figure 11:
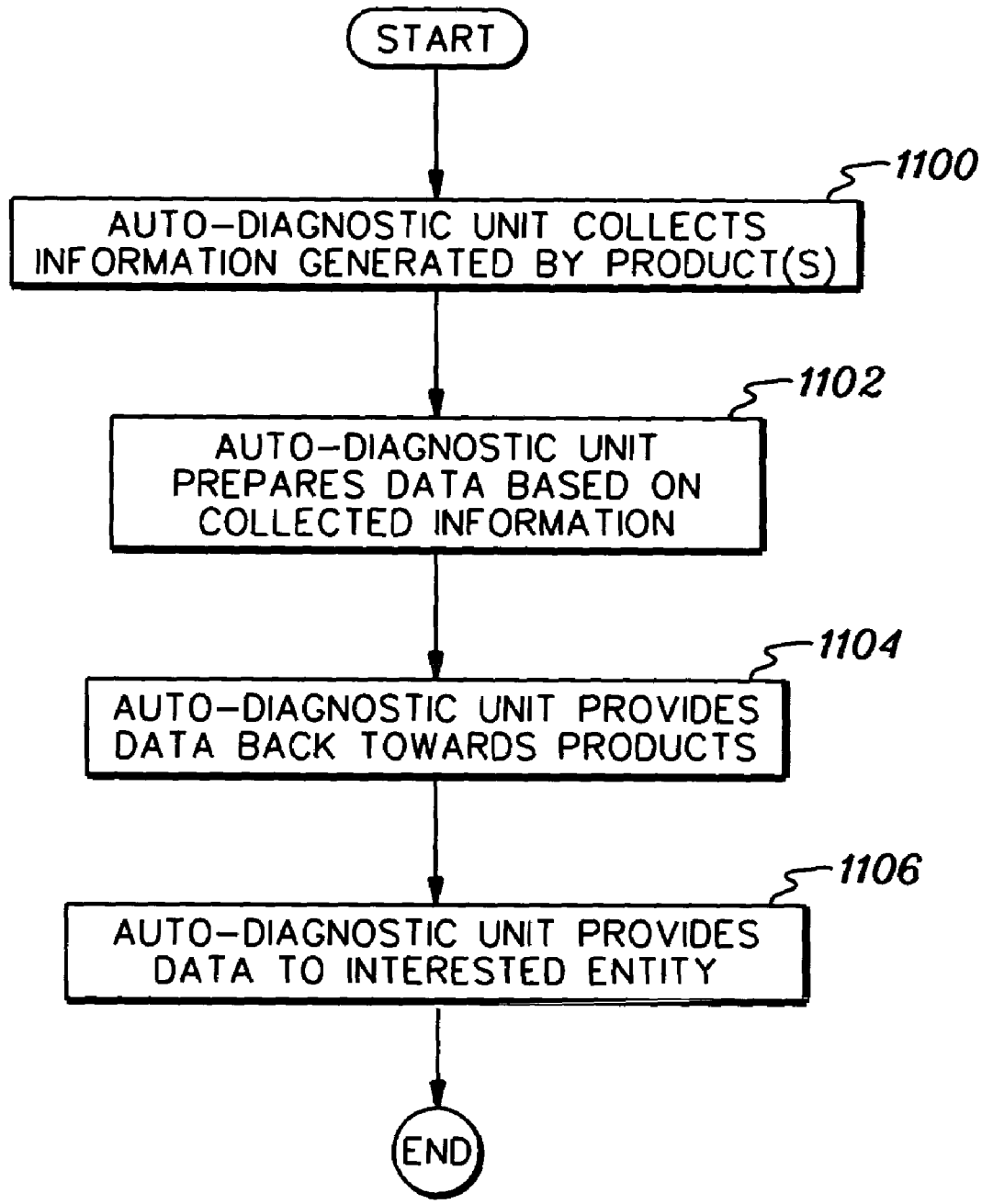
FIG. 11 depicts one embodiment of the logic associated with various functions performed by an auto-diagnostic unit of the present invention.

One embodiment of the logic associated with various functions performed by the auto-diagnostic unit is described with reference to FIG. 11. Initially, the auto-diagnostic unit collects the product usage information from one or more of the storage system complexes, STEP 1100. For example, the auto-diagnostic unit automatically receives parameter information and/or other information generated by the storage media of those storage systems. In one instance, each storage medium includes autonomic logic that monitors usage of the medium, which enables the storage medium to provide values for one or more parameters associated with the storage medium. Additionally, the storage medium forwards information regarding the storage medium, including, for instance, the model of the storage medium, date of manufacture, serial number, hours of operation, environmental conditions, usage patterns, failures, etc. to the auto-diagnostic unit. In another embodiment, at least some of the information regarding the storage medium is stored at the auto-diagnostic unit.

To forward the product usage information to the auto-diagnostic unit, in one embodiment, the storage medium that generated the information forwards the information to the storage system controller via the interface. The storage system controller passes it to the network controller which is coupled via one or more connections to the auto-diagnostic unit.

In one embodiment, the auto-diagnostic unit analyzes the collected information and prepares data regarding the products (e.g., the storage media), STEP 1102. This data includes, for instance, a summary of the analysis. As a particular example, the auto-diagnostic unit looks at storage drives of a particular serial number, manufacture date, etc. to determine data regarding those devices, and the summary includes, for instance, a list of the storage devices with their associated data and the failure rate of those devices. Many other variations of data can also be prepared.

The auto-diagnostic unit then provides this data back towards the product, STEP 1104. That is, the information is, for instance, automatically returned to a product receiver, such as the product itself (e.g., the storage media) and/or another component coupled to the product that was, for instance, involved in forwarding the information to the auto-diagnostic unit, such as the storage controller. The product receiver may use the information to, for instance, compute appropriate coefficients to be used in the equations, determine whether write verify is to be initiated, determine whether a correlation exists, determine a failure rate, determine whether a particular medium should be replaced, etc.

Figure 12:
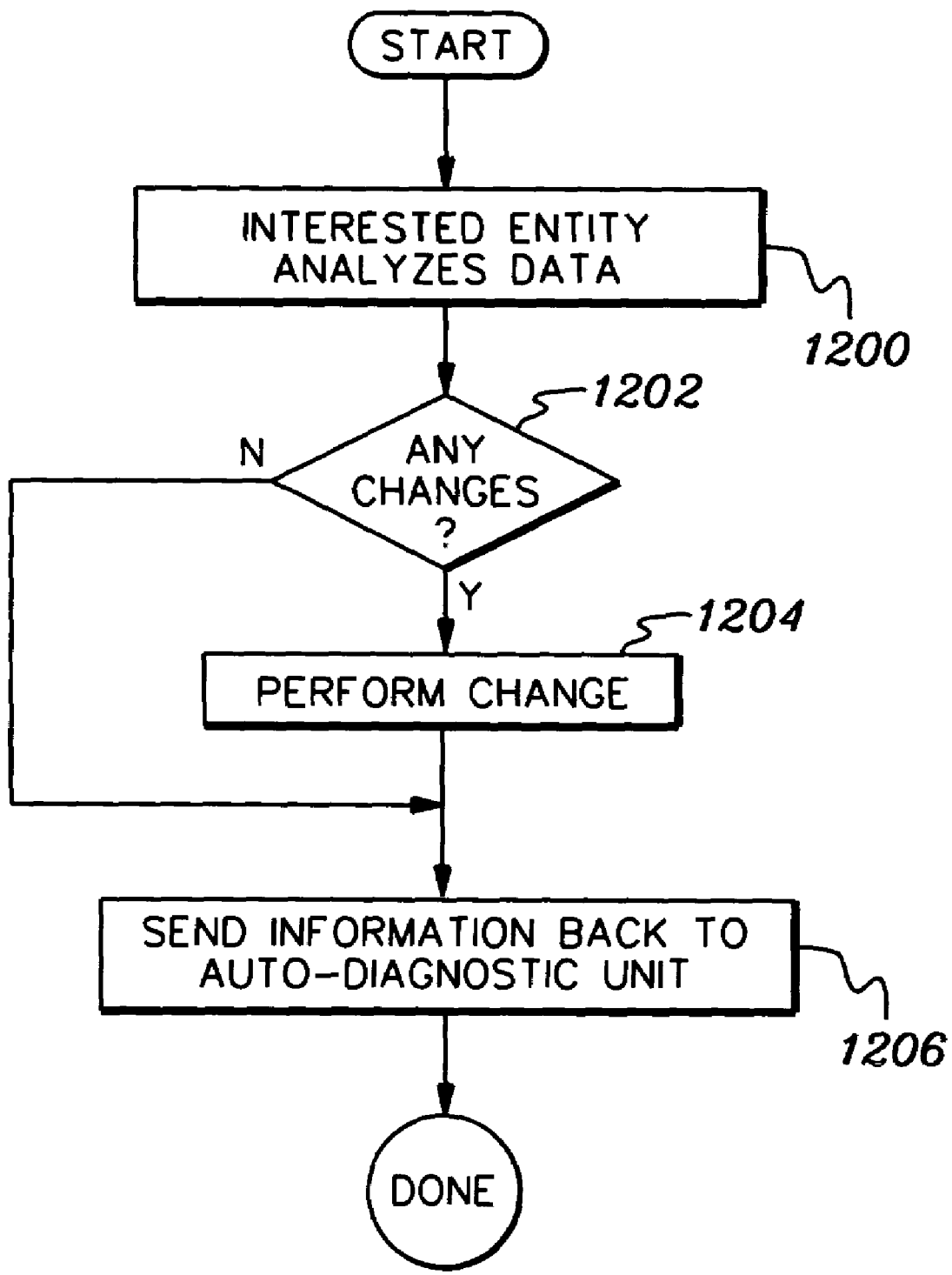
FIG. 12 depicts one embodiment of the logic associated with an interested entity receiving data from the auto-diagnostic unit, in accordance with an aspect of the present invention.

In a further embodiment, the data is automatically sent from the auto-diagnostic unit to one or more interested entities, such as the manufacturer of the storage media, for use by the manufacturer, as deemed appropriate, STEP 1106. One example of this use is described with reference to FIG. 12.

In one embodiment, the interested entity or entities (e.g., the manufacturer) performs its own analysis using this data and possibly information produced by manufacturer testing, STEP 1200, to determine if any changes are to be made to the product, INQUIRY 1202. If there are changes to be made, then these changes are made to, for instance, a product in test, STEP 1204. For example, the manufacturer includes logic to automatically obtain and analyze the information and to automatically effect a change. As an example, a processor determining what change is to be made sends a signal to one or more other processors coupled to the storage medium to effect a change. Examples of changes include, for instance, 1) If the drive is designed to accept a range of RPM, then the RPM may be changed within that range to alter the flyheight, if it is found that drives are failing due to low Flyheight; 2) Drive servo microcode could be reloaded by the system to change the servo seek algorithms, if it is determined that seek time out occurrences are resulting in damage to the disk drive; 3) The servo microcode could be changed to alter the load/unload velocity profiles, if it is determined that the current process is damaging the disk surface due to head/disk interactions; 4) The servo microcode could be changed to effect the off track limits to initiate a write inhibit, if it determined that data is being overwritten on neighboring tracks; 5) A number of programmable features in the disk drive channel module could be loaded with new parameters, such as the write current and/or read head magneto resistive bias current, if it is determined the current values are not optimal for best recording performance.

Moreover, in a further example, the interested entity sends analysis information back to the auto-diagnostic unit, STEP 1206. This can be done whether or not there are changes to be made and whether or not changes are made. In one example, this information is automatically sent back to the auto-diagnostic unit.

Figure 13:
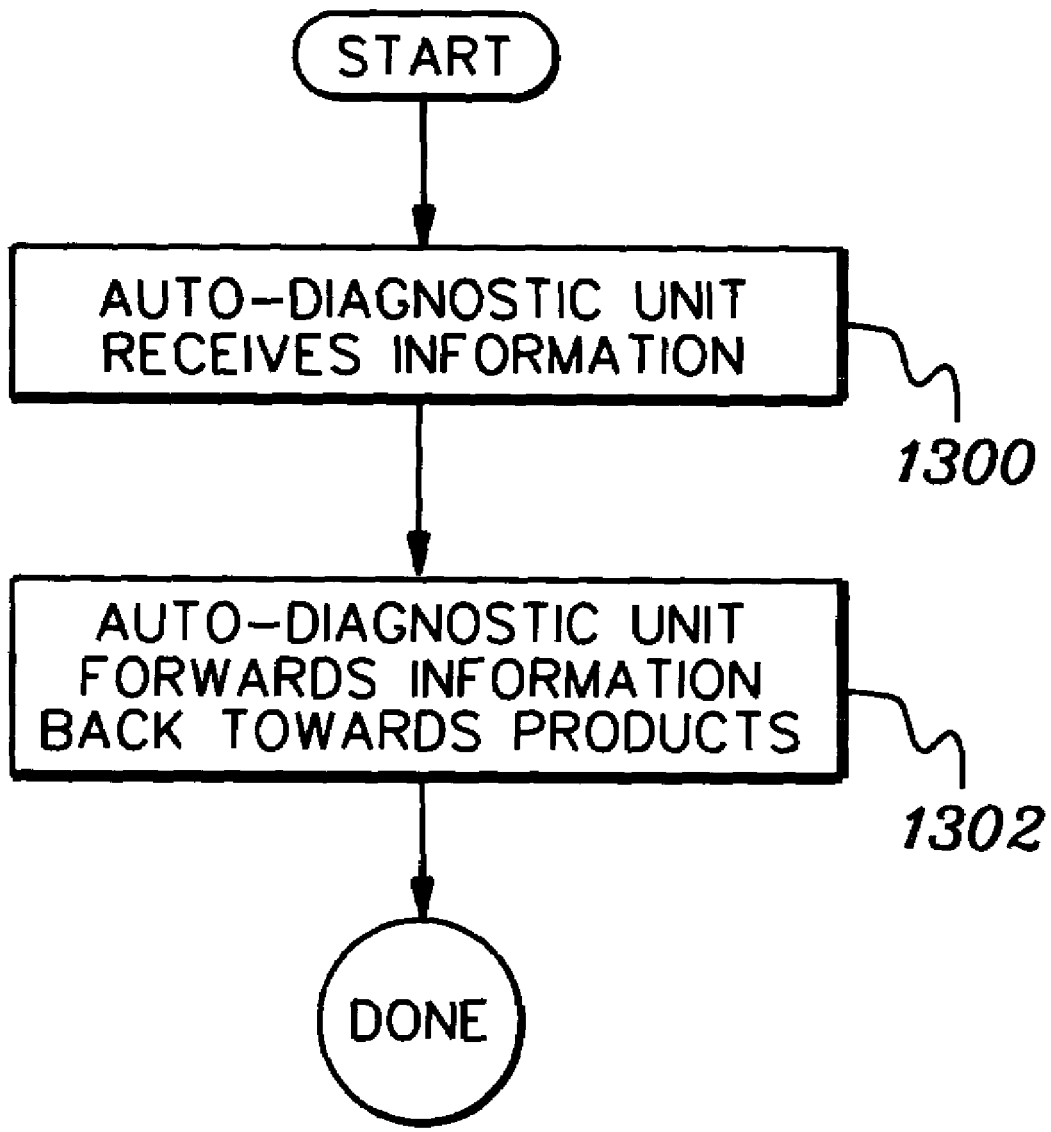
FIG. 13 depicts one embodiment of the logic associated with functions performed by the auto-diagnostic unit in response to receiving information, in accordance with an aspect of the present invention.

The auto-diagnostic unit receives the information, STEP 1300 (FIG. 13) and then automatically send the information back towards the products (e.g., the storage systems or media) in the local environment and/or in the global environment, STEP 1302. This allows adjustments to be made by the product receivers based on real usage data. For instance, the metric coefficients can be appropriately adjusted.

Described in detail above is a capability for automatically collecting, analyzing and disseminating product usage information or data relating to the information. This advantageously enables interested entities to obtain data regarding real-life usage of the products, and may, for instance, enable the entities to determine that a failure may occur and prevent that failure or prevent further failures more rapidly than before.

Aspects of this invention can be used for a broad spectrum of products in any industries or technologies. As examples, it can be used for automotive components, such as tires, or other components; for mechanical devices; for computer logic; as well as for a myriad of other products. Further details regarding some of these other examples are provided below.

Automobile Subcomponents: Monitoring a subcomponent of a user product can provide information to the component designer, component manufacturer and/or the component integrator, e.g. vehicle manufacturer. One example is tire failure which may be due to one or more of the following: tire design, tire manufacture, vehicle design and the product user operation. The vehicle type, vehicle acceleration/deacceleration, vehicle velocity history, vehicle mileage history, tire date of manufacture, tire temperature history, tire pressure history and tire physical location of use could be captured globally and used to predict and determine contributors to tire failure. Such data could be fed back to the component tire designer, component tire manufacturer and/or the vehicle designer to determine cause and eliminate failures.

Appliance Subcomponents: Appliances integrate components from many different manufacturers. For example, a refrigerator uses an electric motor to run a compressor to produce cooling. If the refrigerator internal temperature, external temperature, motor current, motor power on hours are captured globally, such information could be used to predict and determine modes of failure with regard to the refrigerator operating temperature. Additional sensors may also be built into the motor to detect rpm and bearing runout, such sensors can provide information on the motor mechanical bearings by monitoring the bearing drag as indicated by spin up time to operating rpm and bearing wear by monitoring the bearing NRRO during operation. This data could be provided back to the refrigerator designer, refrigerator manufacturer, motor designer and/or motor manufacturer.

Computer System Sub-components: For example, a laptop computer uses several major and common subcomponents. These include disk drives, LCD displays, processors, memory, keyboards and batteries. A system can monitor the individual components, e.g. the hard disk drive parameters as previously described. In addition, the environment conditions of the end user product, in this case the laptop computer, temperature, humidity, shock and vibration, power on hours and position (GPS) can be monitored. A statistical analysis of the global subcomponent monitor information and the subcomponents global failures could be used to predict the reliability and determine cause of failures. This information could be provided back to the component designer, component manufacturer, laptop designer and/or laptop manufacturer to take corrective actions. Such corrective actions could include downloading to laptops new operating parameters, for example, to the disk drive. Other examples, may be to have the laptop notify the user to back up data on a hard disk drive or replace the hard drive.

Figure 14A:
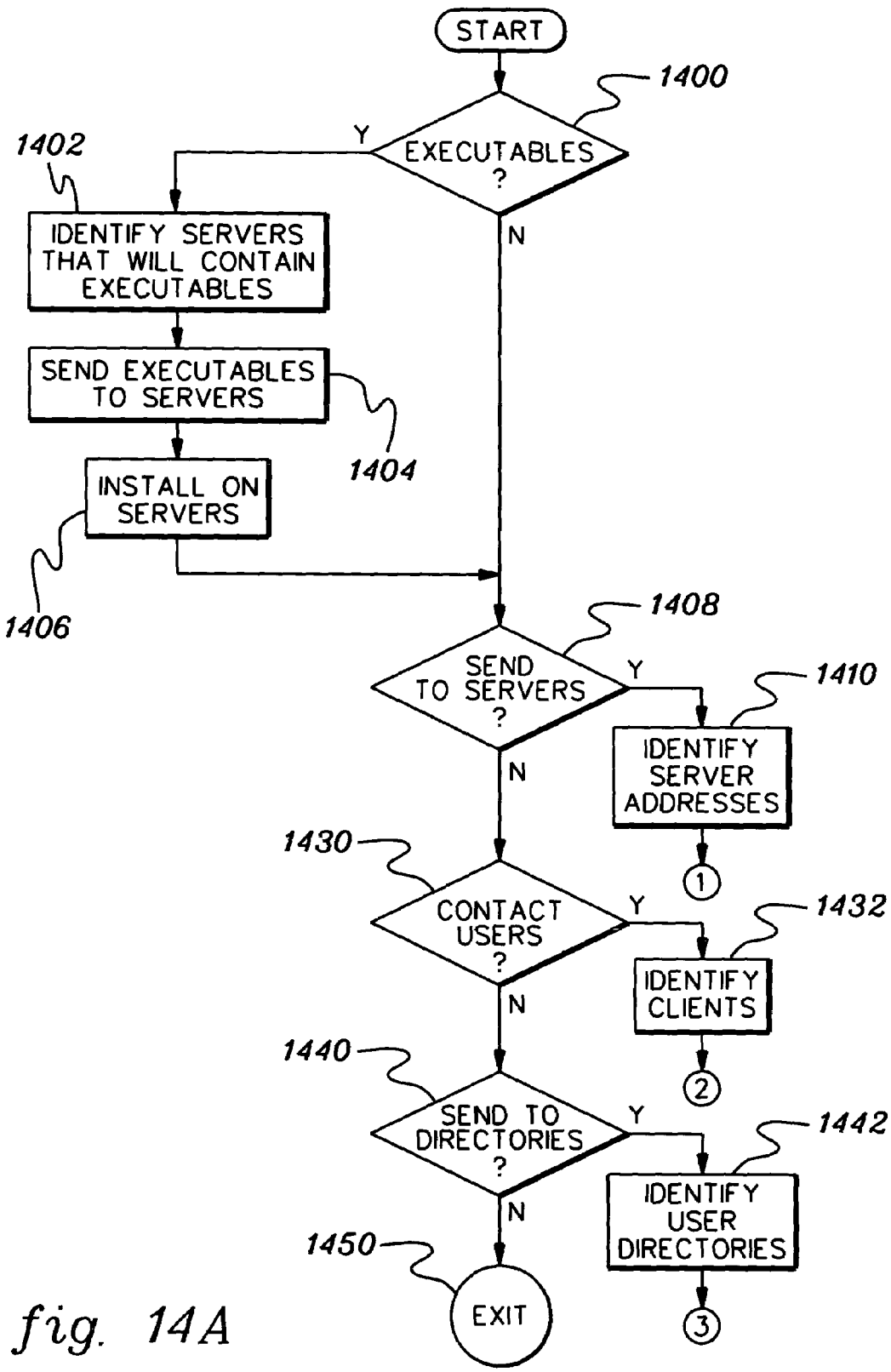
FIGS. 14a-14b depict one embodiment of the logic associated with deploying product usage logic on a processing unit, in accordance with an aspect of the present invention.

In a yet further aspect of the present invention, a technique is provided for deploying the product usage logic on a processing unit. One embodiment of the deployment logic is described with reference to FIGS. 14a-14b.

Initially, a determination is made as to whether there are any programs that are to reside on one or more servers when the product usage logic is executed, INQUIRY 1400. If so, then the one or more servers to include the executables are identified, STEP 1402, and the product usage logic for the one or more servers is transferred directly to the servers' storage via a File Transfer Protocol (FTP) or some other protocol or by copying through the use of a shared file system, STEP 1404. The logic is then installed on the servers, STEP 1406.

Figure 14B:
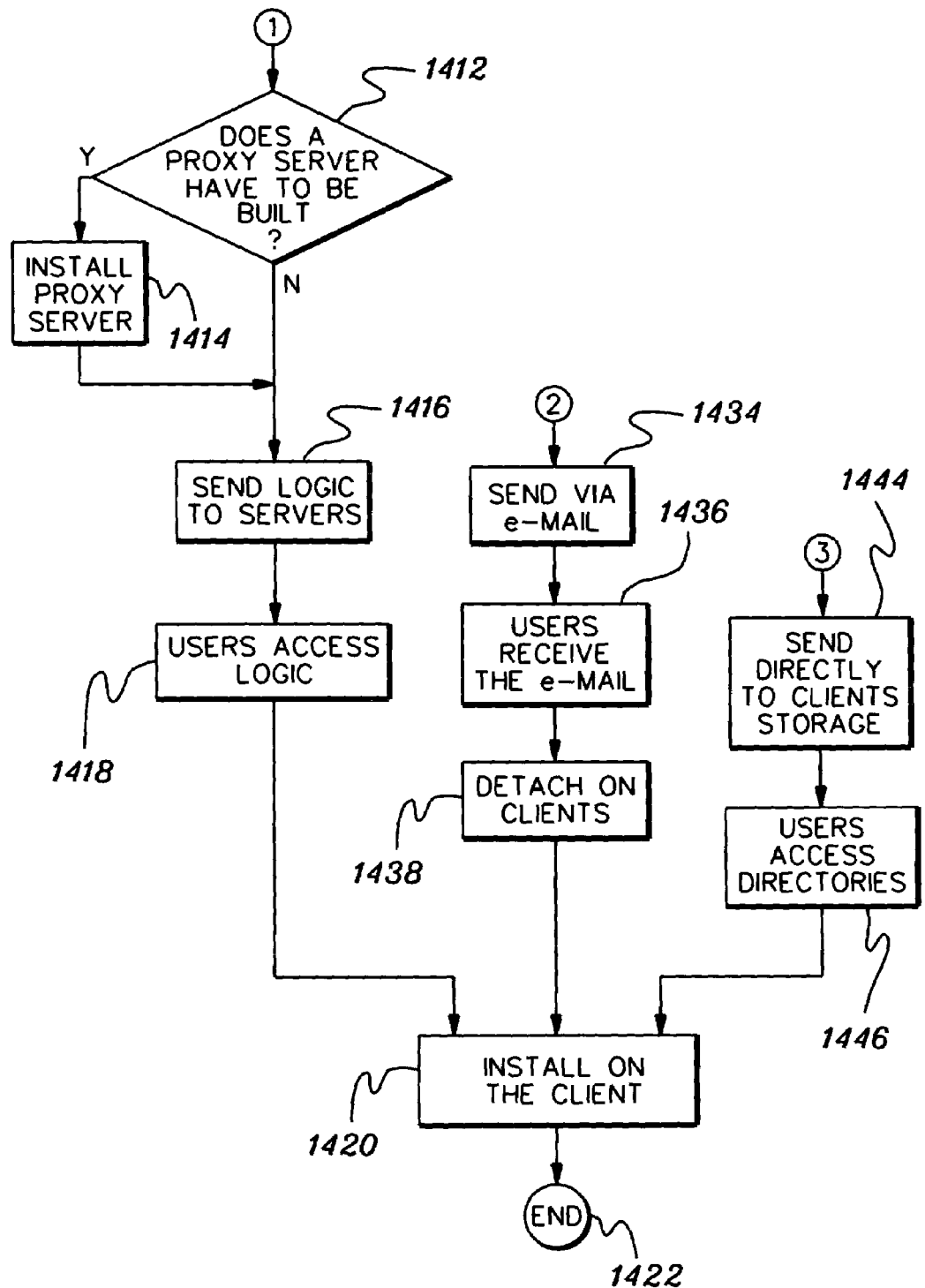

Thereafter, or if there are no executables, a further determination is made as to whether the product usage logic is to be deployed by having users access the logic on a server or servers, INQUIRY 1408. If the users are to access the product usage logic on servers, then the server addresses that are to store the logic are identified, STEP 1410. In one example, a determination is made as to whether a proxy server is to be built to store the product usage logic, INQUIRY 1412 (FIG. 14b). A proxy server is the server that sits between a client application, such as a web browser, and a real server. It intercepts the requests to the real server to see if it can fulfill the request itself. If not, it forwards the request to the real server. The two primary benefits of the proxy server are to improve performance and to filter requests. If a proxy server is to be built, then the proxy server is installed, STEP 1414.

Thereafter, or if a proxy server is not to be built, the product usage logic is sent to the server either via a protocol, such as FTP, or it is copied directly from the source files to the server files via file sharing, STEP 1416. As another example, a transaction is sent to the one or more servers that include the product usage logic and the servers process the transaction, then receive and copy the logic to the servers' file systems.

Once the product usage logic is stored at the servers, the users, via their client computers, access the logic on the servers and copy to their client computers' file systems, STEP 1418. The user then executes the program that installs the logic on the client computer, STEP 1420. In a further example, the servers automatically copy the product usage logic to each client and then run the installation program for the logic at each client computer. This concludes the deployment processing, STEP 1422.

Returning to INQUIRY 1408 (FIG. 14a), if the logic is not to be deployed by having users access the logic on one or more servers, then processing continues with a determination as to whether the logic is to be deployed by sending the logic to users via e-mail, INQUIRY 1430. If so, the set of users where the logic is to be deployed is identified together with the addresses of the user client computers, STEP 1432. The product usage logic is sent via e-mail to each of the user's client computers, STEP 1434 (FIG. 14b). The users receive the e-mail, STEP 1436, and detach the product usage logic from the e-mail to a directory on their client computers, STEP 1438. The user executes the program that installs the logic on the client computer, STEP 1420, and exits the process, STEP 1422.

Returning to INQUIRY 1430 (FIG. 14a), if the product usage logic is not to be deployed via e-mail, then a further determination is made as to whether the logic is to be sent directly to user directories on their client computers, STEP 1440. If so, the user directories are identified, STEP 1442. The product usage logic is directly transferred to the user's client computer directory, STEP 1444 (FIG. 14b). This can be done in several ways, such as, but not limited to, sharing of the file system directories and then copying from the sender's file system to the recipient user's file system, or alternatively, using a transfer protocol, such as file transfer protocol (FTP). The users access the directories on their client file systems in preparation for installing the product usage logic, STEP 1446. The user executes the program that installs the logic on the client computer, STEP 1420, and exits the deployment process, STEP 1422.

Returning to INQUIRY 1440 (FIG. 4a), if the logic is not to be sent directly to the users' directories, then processing ends, STEP 1450.

Described above is a capability that facilitates the automatic collection, analysis and dissemination of product usage information or data relating to the information, and a further capability for deploying product usage logic on processing units. In one embodiment, the automatic analysis is optional.

Although various examples are described above, these are only examples. Many variations to the above may be provided without departing from the spirit of the present invention. For example, storage devices other than magnetic disk drives, such as tape or optical storage devices, including holographic or phase change or magneto-optic or other non-volative memory devices, such as Ferroelectric RAM or Magnetic RAM, may be used. Further, other media and other products may benefit from one or more aspects of the present invention.

In yet other examples, the storage system may be other than that described herein. For example, it may have additional, less and/or different components. The processors, as well as other components, can be other than those examples provided herein. A storage system can monitor drives of more than one type and can determine, for instance, a probability of failure for each type. Many other variations are possible. Additionally, the grouping logic may be included in a component other than the storage controller and/or it may be distributed across various components.

As used herein, the term obtain includes, but is not limited to, receive, be provided, extract, collect, etc.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Figure 2:
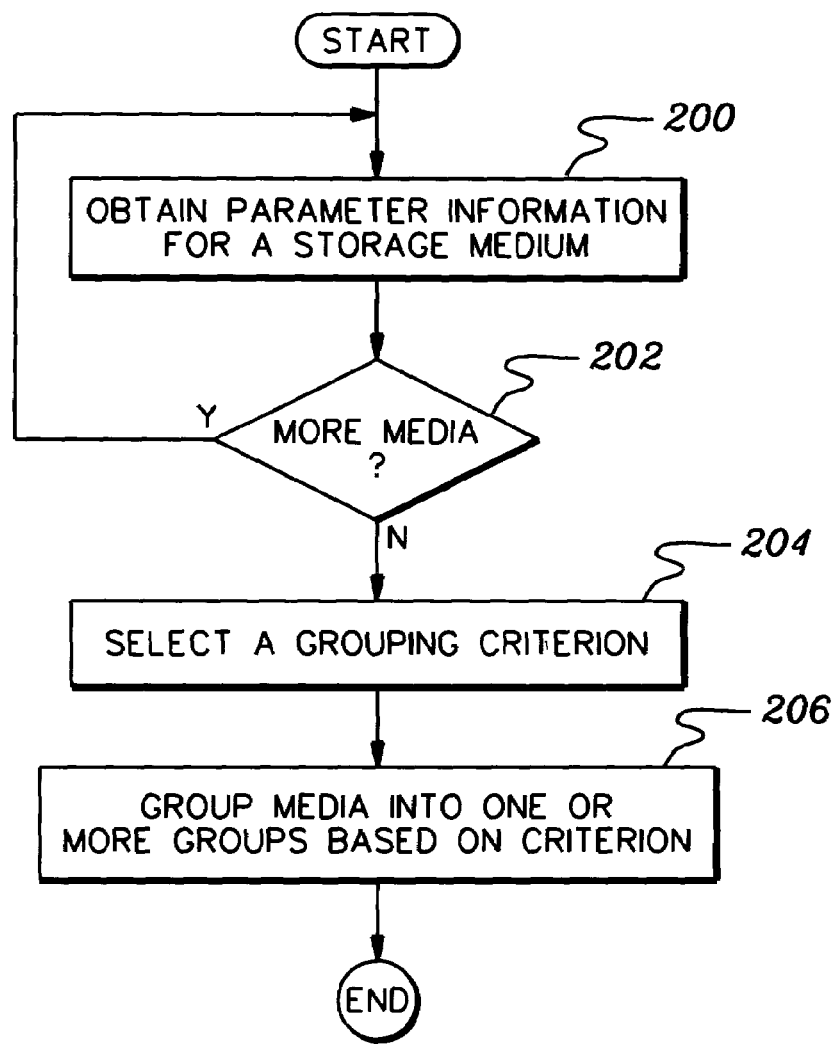
FIG. 2 depicts one embodiment of the logic associated with grouping media into one or more groups based on parameters associated with the media, in accordance with an aspect of the present invention.

As one particular example, the steps of FIG. 2 may be performed in a different order. For example, the grouping criterion can be performed earlier, such as during the manufacturing process and written onto the disk drive reserved area for communication with the storage system thru the SCSI interface, so that the parameter information is obtained only for the selected grouping criterion. As yet a further example, in FIG. 6, the second surface to be selected may be from the same drive rather than a different drive. As yet a further example, one or more of the steps of FIGS. 11-14b may be eliminated, replaced or performed in a differing order. Many other variations are possible and are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of facilitating provision of product usage information to interested entities, said method comprising:
   automatically obtaining, by a processor of a product user, product usage information generated by a plurality of products, used in real-time, non-test environments, wherein the automatically obtained product usage information includes at least product usage information obtained regarding one product local to the product user and product usage information obtained regarding another product global to the product user, wherein the plurality of products include autonomic logic used to automatically monitor one or more parameters of the plurality of products, and wherein the automatically obtaining is independent of product user input;
   using the product usage information obtained by the product user to create a shared knowledge base, wherein the shared knowledge base further includes historic usage data concerning the product local to the product user and the product global to the product user;
   statistically analyzing, by the processor of the product user, content of the shared knowledge base, the content including the product usage information and the historic usage data, wherein the analyzing produces an analysis comprising expression of a difference in the product usage information by make, model, and manufacturing vintage;
   automatically providing a summary of the analysis to an interested entity;
   performing, by the interested entity, a second analysis using the received summary of analysis and information from testing by the entity of a product of the interested entity;
   automatically determining based on results of the second analysis and an initial performance metric of a product of the interested entity whether a change is to be made to a product of the interested entity;
   sending, by the interested entity, the results of the second analysis to the autonomic logic of the local product of the product user;
   automatically changing the product of the interested entity based on the determining step and automatically changing the local product of the product user based on the results of the second analysis received by the autonomic logic.

2. The method of claim 1, wherein the automatically obtaining comprises automatically forwarding, by the plurality of products, the product usage information, wherein the plurality of products monitor one or more parameters of the plurality of products.

3. The method of claim 1, further comprising:
   providing the summary of the analysis to a product receiver related to the plurality of products; and using the summary of the analysis to effect one or more changes of one or more products of the plurality of products.

4. The method of claim 3, wherein the using comprises using the summary to regroup a number of the products of the plurality of products.

5. The method of claim 4, wherein to regroup further includes using a grouping criterion, as well as the summary, to regroup the number of products.

6. The method of claim 5, wherein to regroup further comprises prioritizing the number of products and using the priority of the number of products, the grouping criterion and the summary to regroup the number of products.

7. The method of claim 1, further comprising automatically receiving information relating to the summary of the analysis from the at least one interested entity.

8. The method of claim 1, further comprising:
analyzing by the at least one interested entity at least one of the summary and data related to the plurality of products obtained by the at least one interested entity; and
providing data to a product receiver of the plurality of products based on the analyzing.

9. The method of claim 8, further comprising automatically effecting a modification to a product under test, in response to the analyzing.

10. The method of claim 1, wherein the at least one interested entity comprises at least one of a manufacturer, a designer, a creator, a developer, a constructor, an integrator, and a quality maintainer.

11. The method of claim 1, wherein the one or more products comprise one or more storage devices.

12. A computer program product for facilitating provision of product usage information to interested entities, said computer program product comprising:
a storage medium readable by a processor and storing instructions for execution by the processor for performing a method comprising:
automatically obtaining, by a processor of a product user, product usage information generated by a plurality of products, used in real-time, non-test environments, wherein the automatically obtained product usage information includes at least product usage information obtained regarding one product local to the product user and product usage information obtained regarding another product global to the product user, wherein the plurality of products include autonomic logic used to automatically monitor one or more parameters of the plurality of products, and wherein the automatically obtaining is independent of product user input;
using the product usage information obtained by the product user to create a shared knowledge base, wherein the shared knowledge base further includes historic usage data concerning the product local to the product user and the product global to the product user;
statistically analyzing, by the processor of the product user, content of the shared knowledge base, the content including the product usage information and the historic usage data, wherein the analyzing produces an analysis comprising expression of a difference in the product usage information by make, model, and manufacturing vintage;
automatically providing a summary of the analysis to an interested entity;
performing, by the interested entity, a second analysis using the received summary of analysis and information from testing by the entity of a product of the interested entity;
automatically determining based on results of the second analysis and an initial performance metric of a product of the interested entity whether a change is to be made to a product of the interested entity;
sending, by the interested entity, the results of the second analysis to the autonomic logic of the local product of the product user;
automatically changing the product of the interested entity based on the determining step and automatically changing the local product of the product user based on the results of the second analysis received by the autonomic logic.

13. The computer program product of claim 12, wherein the automatically obtaining comprises automatically forwarding, by the plurality of products, the product usage information, wherein the plurality of products monitor one or more parameters of the plurality of products.

14. The computer program product of claim 12, wherein the method further comprises:
providing the summary of the analysis to a product receiver related to the plurality of products; and
using the summary of the analysis to effect one or more changes of one or more products of the plurality of products.

15. The computer program product of claim 14, wherein the using comprises using the summary to regroup a number of the products of the plurality of products.

16. The computer program product of claim 15, wherein to regroup further includes using a grouping criterion, as well as the summary, to regroup the number of products.

17. The computer program product of claim 16, wherein to regroup further comprises prioritizing the number of products and using the priority of the number of products, the grouping criterion and the summary to regroup the number of products.

18. The computer program product of claim 12, wherein the method further comprises automatically receiving information relating to the summary of the analysis from the at least one interested entity.

19. The computer program product of claim 12, wherein the method further comprises:
analyzing by the at least one interested entity at least one of the summary and data related to the plurality of products obtained by the at least one interested entity; and
providing data to a product receiver of the plurality of products based on the analyzing.

20. The computer program product of claim 19, wherein the method further comprises automatically effecting a modification to a product under test, in response to the analyzing.

21. The computer program product of claim 12, wherein the at least one interested entity comprises at least one of a manufacturer, a designer, a creator, a developer, a constructor, an integrator, and a quality maintainer.

22. The computer program product of claim 12, wherein the one or more products comprise one or more storage devices.

23. A computer system for facilitating provision of product usage information to interested entities, said computer system comprising:
a memory;
and a processor in communications with the memory, wherein the computer system is capable of performing a method, said method comprising:
automatically obtaining, by a processor of a product user, product usage information generated by a plurality of products, used in real-time, non-test environments, wherein the automatically obtained product usage information includes at least product usage information obtained regarding one product local to the product user and product usage information obtained regarding another product global to the product user, wherein the plurality of products include autonomic logic used to automatically monitor one or more parameters of the plurality of products, and wherein the automatically obtaining is independent of product user input;

using the product usage information obtained by the product user to create a shared knowledge base, wherein the shared knowledge base further includes historic usage data concerning the product local to the product user and the product global to the product user;

statistically analyzing, by the processor of the product user, content of the shared knowledge base, the content including the product usage information and the historic usage data, wherein the analyzing produces an analysis comprising expression of a difference in the product usage information by make, model, and manufacturing vintage;

automatically providing a summary of the analysis to an interested entity;

performing, by the interested entity, a second analysis using the received summary of analysis and information from testing by the entity of a product of the interested entity;

automatically determining based on results of the second analysis and an initial performance metric of a product of the interested entity whether a change is to be made to a product of the interested entity;

sending, by the interested entity, the results of the second analysis to the autonomic logic of the local product of the product user;

automatically changing the product of the interested entity based on the determining step and automatically changing the local product of the product user based on the results of the second analysis received by the autonomic logic.

24. The system of claim 23, wherein the automatically obtaining comprises automatically forwarding, by the plurality of products, the product usage information, wherein the plurality of products monitor one or more parameters of the plurality of products.

25. The system of claim 23, further comprising:
providing the summary of the analysis to a product receiver related to the plurality of products; and
using the summary of the analysis to effect one or more changes of one or more products of the plurality of products.

26. The system of claim 25, wherein the using comprises using the summary to regroup a number of the products of the plurality of products.

27. The system of claim 26, wherein to regroup further includes using a grouping criterion, as well as the summary, to regroup the number of products.

28. The system of claim 27, wherein to regroup further comprises prioritizing the number of products and using the priority of the number of products, the grouping criterion and the summary to regroup the number of products.

29. The system of claim 23, further comprising automatically receiving information relating to the summary of the analysis from the at least one interested entity.

30. The system of claim 23, further comprising:
analyzing by the at least one interested entity at least one of the summary and data related to the plurality of products obtained by the at least one interested entity; and
providing data to a product receiver of the plurality of products based on the analyzing.

31. The system of claim 30, further comprising automatically effecting a modification to a product under test, in response to the analyzing.

32. The system of claim 23, wherein the at least one interested entity comprises at least one of a manufacturer, a designer, a creator, a developer, a constructor, an integrator, and a quality maintainer.

33. The system of claim 23, wherein the one or more products comprise one or more storage devices.

* * * * *